United States Patent
Marchal et al.

(10) Patent No.: US 9,131,703 B2
(45) Date of Patent: Sep. 15, 2015

(54) POWDER OF FERMENTED MILK OR OF YOGURT WITH A HIGH DENSITY OF LACTIC FERMENTS

(75) Inventors: Laurent Marchal, Villemoisson sur Orge (FR); Pierre Aymard, Antony (FR); Yvo Geysels, Bocholot (BE); Christophe Daval, Choisy le Roi (FR); Pierre Jessenne, Boeschepe (FR); Francis Lecroix, Godewaersvelde (FR)

(73) Assignee: INTERCONTINENTAL GREAT BRANDS LLC, East Hannover, NJ (US)

( * ) Notice: Subject to any disclaimer, the term of this patent is extended or adjusted under 35 U.S.C. 154(b) by 609 days.

(21) Appl. No.: 12/160,170

(22) PCT Filed: Jan. 8, 2007

(86) PCT No.: PCT/FR2007/000024
§ 371 (c)(1),
(2), (4) Date: Nov. 25, 2008

(87) PCT Pub. No.: WO2007/077401
PCT Pub. Date: Jul. 12, 2007

(65) Prior Publication Data
US 2009/0304864 A1    Dec. 10, 2009

(30) Foreign Application Priority Data
Jan. 6, 2006  (FR) ...................................... 06 00130

(51) Int. Cl.
*A21D 13/08* (2006.01)
*A23C 9/123* (2006.01)
*A23L 1/30* (2006.01)

(52) U.S. Cl.
CPC .............. *A21D 13/08* (2013.01); *A23C 9/1232* (2013.01); *A23C 9/1238* (2013.01); *A23L 1/3014* (2013.01); *A23Y 2220/15* (2013.01); *A23Y 2240/75* (2013.01)

(58) Field of Classification Search
USPC .......................................................... 426/43
See application file for complete search history.

(56) References Cited

U.S. PATENT DOCUMENTS 3,985,901 A * 10/1976 Gonzalez Barberan ........ 426/43
4,289,788 A *  9/1981 Cajigas ........................... 426/61

(Continued)

FOREIGN PATENT DOCUMENTS

CA   2025390 A1  3/1991
CA   2213113 C   1/2008

(Continued)

OTHER PUBLICATIONS

Mullan, W.M.A. (2002). Probiotic microorganisms in food. Properties, benefits, safety and enumeration. [On-line]. Available from: http://www.dairyscience.info/probiotics/50-probiotics.html?showall=1. Accessed: Jul. 26, 2011. Revised.*

(Continued)

*Primary Examiner* — D. Lawrence Tarazano
*Assistant Examiner* — Philip Dubois
(74) *Attorney, Agent, or Firm* — Birch, Stewart, Kolasch & Birch, LLP

(57) ABSTRACT

The present application relates to a fermented milk or yoghurt powder which contains very high contents of *S. thermophilus* and *L. bulgaricus*, and which exhibits exceptional storage capacities. In the powder according to the invention, no substantial loss of live *S. thermophilus* and *L. bulgaricus* is observed after four months of storage at 20° C. The powder according to the invention has microbiological characteristics such that it itself corresponds to the name yoghurt or fermented milk.

23 Claims, 12 Drawing Sheets

(56) References Cited

U.S. PATENT DOCUMENTS

| | | | |
|---|---|---|---|
| 5,382,438 | A | 1/1995 | Hottinger et al. |
| 5,716,615 | A | 2/1998 | Cavaliere et al. |
| 6,010,725 | A * | 1/2000 | Meister et al. .................. 426/61 |
| 6,068,863 | A | 5/2000 | Dupart et al. |
| 6,541,027 | B1 | 4/2003 | Antoine et al. |
| 2003/0198712 | A1 * | 10/2003 | Klug et al. ...................... 426/93 |
| 2003/0211218 | A1 | 11/2003 | Cote et al. |
| 2005/0074440 | A1 * | 4/2005 | Lin ............................ 424/93.45 |

FOREIGN PATENT DOCUMENTS

| | | |
|---|---|---|
| DE | 3713136 A1 | 7/1988 |
| EP | 0 518 096 A1 | 12/1992 |
| EP | 0 818 529 A1 | 1/1998 |
| EP | 0 848 908 A1 | 6/1998 |
| EP | 0 924 993 A1 | 6/1999 |
| FR | 2 609 044 A1 | 7/1988 |
| FR | 2 748 903 A1 | 11/1997 |
| FR | 2 793 257 A1 | 11/2000 |
| WO | 2007/101675 A1 | 9/2007 |
| WO | WO 2013/182564 A1 | 12/2013 |

OTHER PUBLICATIONS

Roos, Importance of glass transition and water activity to spray drying and stability of dairy powders, Lait, vol. 82, No. 4, Jul.-Aug. 2002 First International Symposium on Spray Drying of Milk Products pp. 475-484.*

Hassan, Journal of Dairy Science, vol. 86, Issue 5, May 2003, pp. 1632-1638.*

Welman, TRENDS in Biotechnology vol. 21 No. 6 Jun. 2003.*

Bielecka, Maria, et al., "Survival of Synergistic Sets of *Streptococcus salivarius* Subsp. *thermophilus* and *Lactobacillus delbrueckii* Subsp. *bulgaricus* Cultures During Spray Drying of Yogurt," Polish Journal of Food and Nutrition Sciences, 1998, pp. 267-274, vol. 7, No. 2, XP008067804.

Bielecka, Maria, et al., "Effect of Spray Drying Temperature of Yoghurt on the Survival of Starter Cultures, Moisture Content and Sensoric Properties of Yoghurt Powder," Nahrung-Food VCH Verlagsgesellschaaft, 2000, pp. 257-260, vol. 44, No. 4, XP008067749.

Rybka, S., et al., "The Survival of Culture Bacteria in Fresh and Freeze-Dried AB Yoghurts," Australian Journal of Dairy Technology, Nov. 1995, pp. 51-57, vol. 50, No. 2, Dairy Industry Association of Australia, Melbourne, AU, XP000543353.

Kumar, P., et al., "Yoghurt Powder—A Review of Process Technology, Storage and Utilization," Food and Bioproducts Processing, Food and Bioproducts Processing-Institution of Chemical Engineers, Jun. 2004, pp. 133-142, vol. 82, No. C2, Rugby, GB, XP008067798.

"Yogurt Culture Does Live Performance," Prepared Foods, Jun. 1991, p. 53, vol. 160, No. 7, Gorman Publishing, Chicago, IL, US, XP008067799.

Rao, D.R., et al., "Biosynthesis and Utilization of Folic Acid and Vitamin $B_{12}$ by Lactic Cultures in Skim Milk," J. Dairy Science, 1984, pp. 1169-1174, vol. 67, XP008087823.

Rao, D.R., et al., "Vitamin Content of Cultured Milk Products," Cultured Dairy Products Journal, Feb. 1987, pp. 6-10, vol. 22, XP008087812.

Smid, E.J., et al., "Increase of Folate Levels in Fermented Foods," Milk and Dairy Products, 2001, pp. 13-15, vol. 10, XP008087821.

* cited by examiner

POWDER OF FERMENTED MILK OR OF YOGURT WITH A HIGH DENSITY OF LACTIC FERMENTS

FIELD OF THE INVENTION

The present application relates to the dairy industry and to the food industry.

It relates to a powder of fermented milk or of yogurt (powder of fermented milk or of yogurt), which comprises at least one strain of *Streptococcus thermophilus* and at least one strain of *Lactobacillus bulgaricus* and which has a high concentration of live or viable lactic ferments.

It also relates to means for producing said powder, and more particularly to a process for producing yogurts or fermented milks with a high concentration of live or viable lactic ferments, to a process for producing said powder from said fermented milks or yogurts, and to intermediate and end products employed or obtained by carrying out said processes.

It also relates to applications of the powder of the invention in the food industry, and more particularly in the field of dairy products, biscuits and confectionery.

PRIOR ART

Many tests for producing fermented milk or yogurt powder have been carried out in the prior art.

Prior art solutions do not employ *S. thermophilus-L. bulgaricus* symbiosis, carried out on a dairy substrate so that the substrate is transformed into a product in the form of a powder which is suitable for human consumption and which can be designated a fermented milk or yogurt, with a population of lactic ferments and in particular of *S. thermophilus* of at least $5 \times 10^8$ cfu/g and/or with a population of *L. bulgaricus* of at least $1 \times 10^4$ cfu/g.

Prior art solutions generally describe powderizing media which are the culture media. Said culture media cannot produce a product which falls within the definition of a fermented milk or yogurt. In general, they also cannot be supplied to human beings.

Further, several prior art solutions envisage concentrating the culture media before powderizing, or mixing that culture media concentrate with other compounds before powderizing.

This is the case, for example, with solutions described in European patent EP-B1-0 924 993 (Nestlé S. A.), which discloses a dehydrated food product which contains lactic bacteria, and EP-B1-0 818 529, which discloses a powderizing drying process (Nestlé S. A.).

In both cases, the lactic bacteria are supplied in the form of a pre-concentrated culture medium. The food product obtained by using that type of prior art is a food which is not a fermented food.

The present invention proposes a powder of fermented milk or of yogurt which itself can be designated a fermented milk or yogurt, i.e. a powder of fermented milk or yogurt with a high live or viable *S. thermophilus* and *L. bulgaricus* concentration. The powder of the invention results from lactic symbiosis and results in high *S. thermophilus* and *L. bulgaricus* concentrations without needing to add live lactic ferments after inoculation for fermentation.

The powder of the invention has particularly high *S. thermophilus* and *L. bulgaricus* contents: these are greatly above the legal threshold for designating it as a fermented milk or yogurt, and has remarkable storage properties.

SUMMARY OF THE INVENTION

The present application relates to:
- a process for producing yogurt or fermented milk with a high lactic bacteria concentration;
- a process for producing powder of fermented milk or of yogurt, said powder being obtained from a yogurt or fermented milk with a high concentration of lactic bacteria, and itself having a high concentration of lactic bacteria;
- an inoculated dairy substrate, which may be obtained as an intermediate product when producing the yogurt or fermented milk of the invention and/or when carrying out the powder production process of the invention;
- a yogurt of fermented milk which can be obtained as a final product in the process for producing a yogurt or fermented milk of the invention, and/or as an intermediate product when producing the powder of the invention;
- the final product obtained at the end of the inventive powder production process, namely a powder of fermented milk or of yogurt;
- compositions, more particularly foodstuffs, such as biscuits, confectionery, containing at least one powder in accordance with the invention.

The powder of fermented milk or of yogurt of the invention is highly concentrated in live or viable lactic ferments, and more particularly in *S. thermophilus* and *L. bulgaricus*.

It results from symbiotic activity between *S. thermophilus* and *L. bulgaricus*: it does not correspond to a juxtaposition of strains which would simply be added to a medium then sprayed, but to conservative powderizing of a milk after symbiotic lactic fermentation driven by *S. thermophilus* and *L. bulgaricus*.

The fact that the powder of the invention has high *S. thermophilus* and *L. bulgaricus* contents and that it results from lactic symbiosis between *S. thermophilus* and *L. bulgaricus* means that the powder of the invention per se can be designated a fermented milk or yogurt.

To the Applicant's knowledge, prior art powders do not have a composition and lactic ferment contents which allow them to be designated a yogurt or fermented milk. In fact, commercial yogurt powders usually have a very low residual lactic flora content which, in the prior art, is considered advantageous from a technological viewpoint as it provides better organoleptic stability. Certain commercial powders have higher lactic ferment contents but use a process which enriches after drying (supply of exogenous bacteria). Others have high *S. thermophilus* contents but barely measurable *L. bulgaricus* contents. Finally, other yogurt powders are stated to contain high lactic ferment concentrations, or even to have a stable quality for 6 months at ambient temperature; however, measurements carried out by the Applicant on such powders, details of which are given below (see Examples 12 and 13 below) show that the initial real population is lower than that stated, and that such powders do not have sufficient stability during storage, which results in a significant reduction in lactic flora.

The powder of the invention has remarkable storage properties, both at 5° C. and at 20° C. As an example, after 4 months of storage at 20° C., no substantial reduction in the populations of live or viable *S. thermophilus* and *L. bulgaricus* was observed.

At 35° C., a gradual reduction in the lactic flora was observed, but at a rate which is generally comparable with that of commercial powders stored at 5° C. or 20° C., which are considered by the skilled person to be ideal.

To the knowledge of the Applicant, no prior art powder has at the same time:
- as high a S. thermophilus and L. bulgaricus content; and
- such good storage properties;

as the powder of the invention (see Examples 12 and 13 below).

In the present application, ST (or St) signifies S. thermophilus, and LB signifies L. bulgaricus.

lower curve: acidification kinetics obtained by inoculating a dairy substrate with a strain of ST in an amount of $2.7 \times 10^9$ cfu/g and with a strain of LB in an amount of $1.4 \times 10^7$ cfu/g (inoculation in accordance with the invention, resulting in a yogurt in accordance with the invention); and top curve: acidification kinetics obtained by inoculating an identical dairy substrate with the same ST and LB strains, but at doses lower than those recommended in the invention (ST inoculation $1 \times 10^7$ cfu/g, and LB inoculation $5 \times 10^4$ cfu/g).

Figure 5:
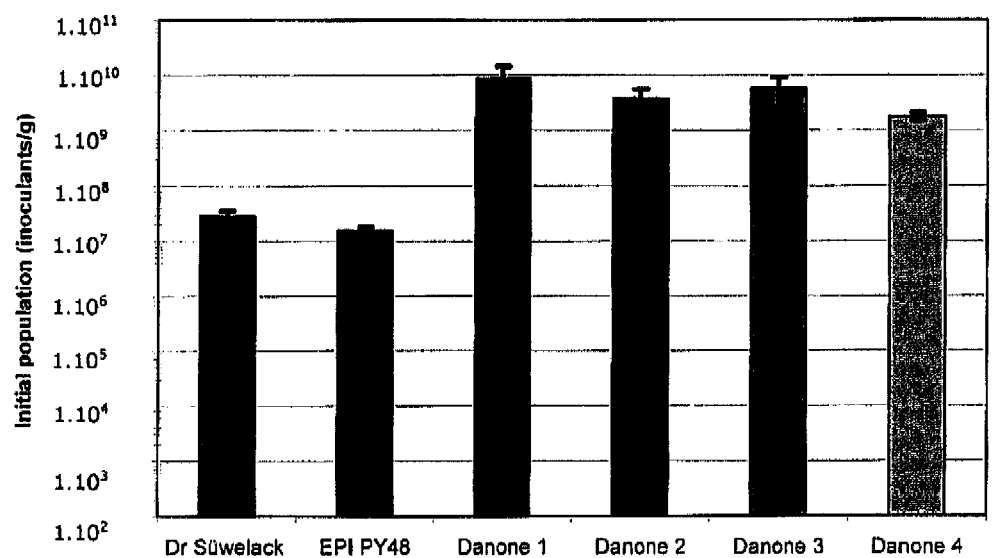

FIG. 5 shows the differences in the initial population of ferments (in this Figure, "Danone 1", "Danone 2", "Danone 3" and "Danone 4" are the powders of the present invention, while "Dr Süwelack M/A 5.4 Active" and "EPI PY48" are prior art powders).

Figure 6:
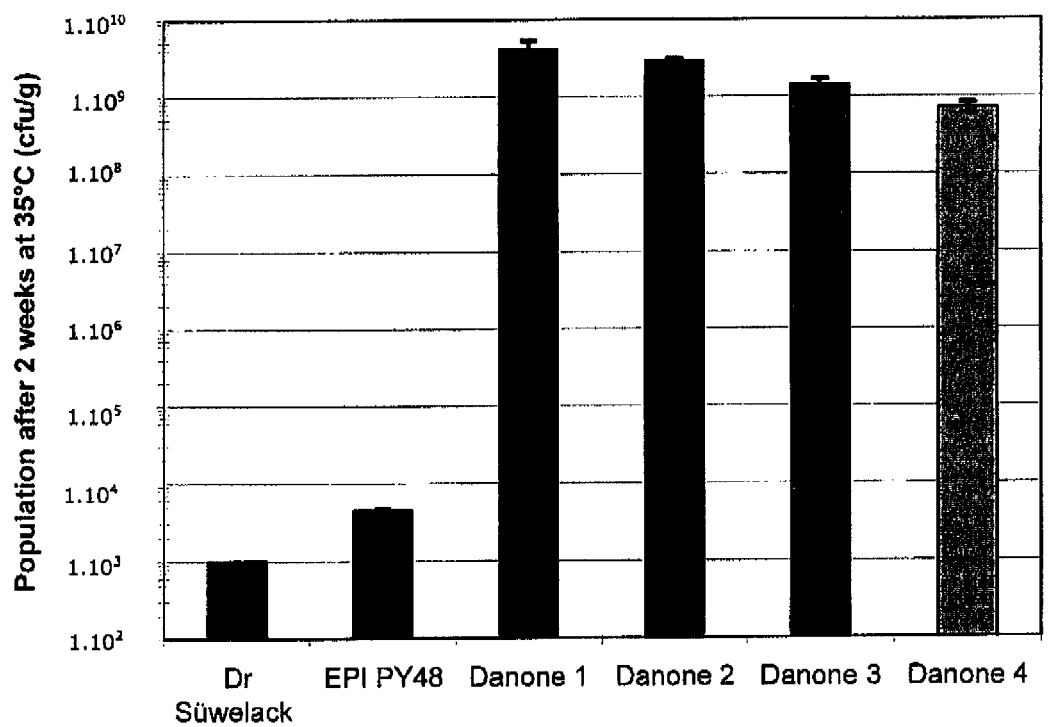

FIG. 6 shows the stability of the ferments in the powders of the invention stored at 35° C. for 2 weeks (in FIG. 6, "Danone 1", "Danone 2", "Danone 3" and "Danone 4" are the powders of the present invention).

Figure 7:
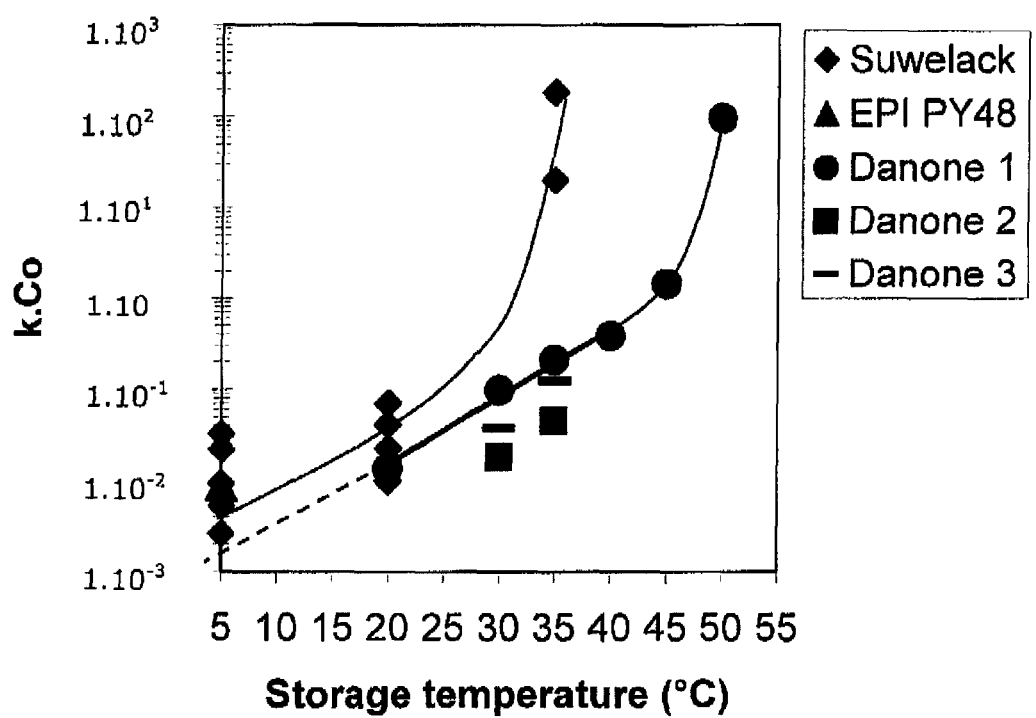

FIG. 7 shows the change in the rate constant (product of $k \times C_0$) as a function of the storage temperature. In FIG. 7, "Danone 1", "Danone 2" and "Danone 3" are the powders of the present invention, while "Süwelack" (=Dr Süwelack N/A 5.4 Active") and "EPI PY48" are prior art powders.

Figure 8A:
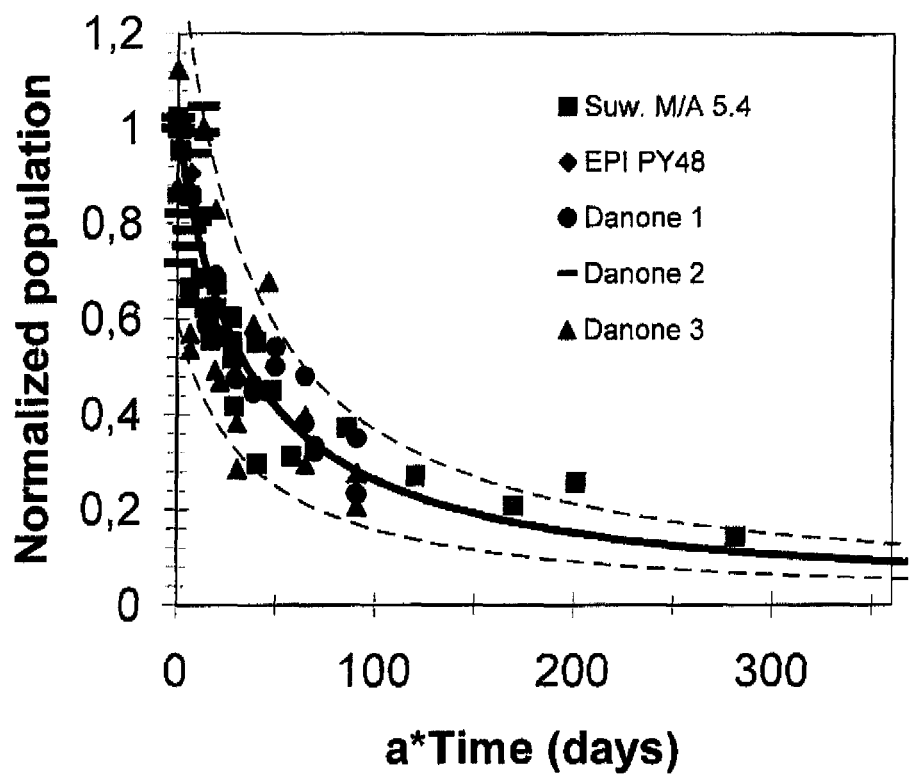
Figure 8B:
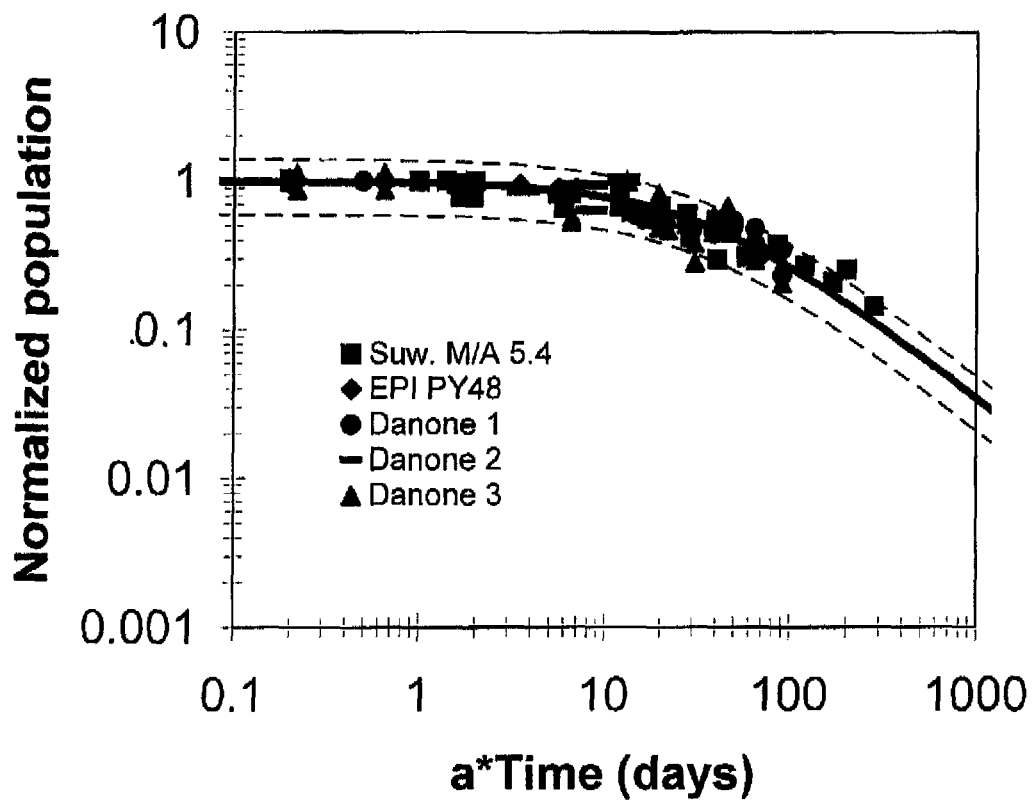

FIGS. 8A and 8B show the change in the normalized population of lactic ferments with time for commercial powders, and for the powders of the invention. The powders of the invention are "Danone 1", "Danone 2" and "Danone 3", while "Suw. M/A 5.4 Active (=Dr Süwelack M/A 5.4 Active") and "EPI PY48" are prior art powders.

FIG. 8A: original curve in linear coordinates (continuous thick line=$2^{nd}$ order; dotted lines=$2^{nd}$ order plus or minus 20%).

FIG. 8B: original curve in logarithmic coordinates (continuous think line=$2^{nd}$ order; dotted lines=2 order plus or minus 20%).

Figure 9:
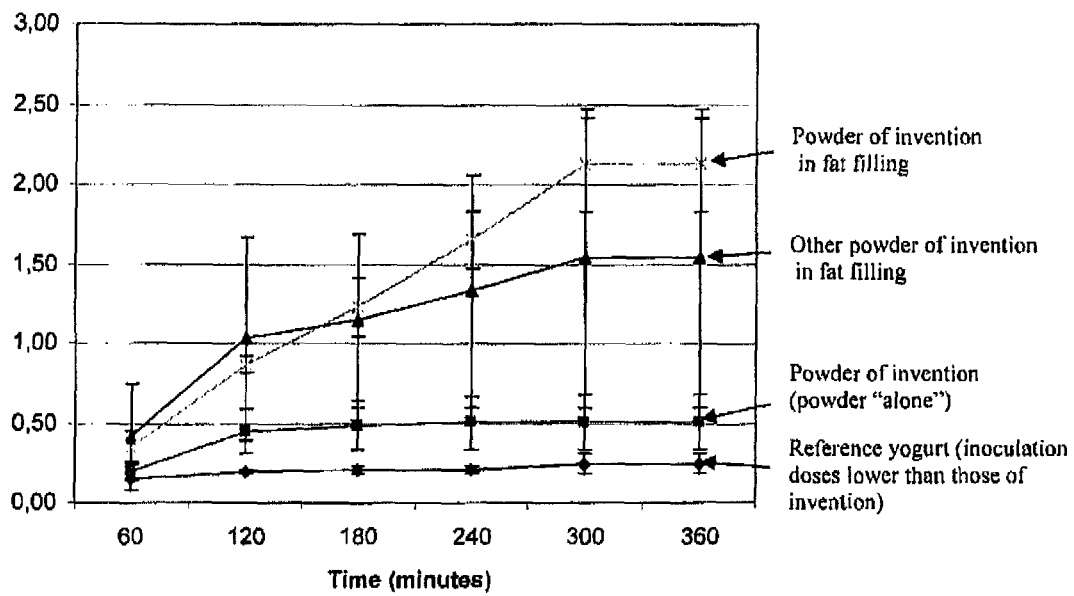
Figure 10:
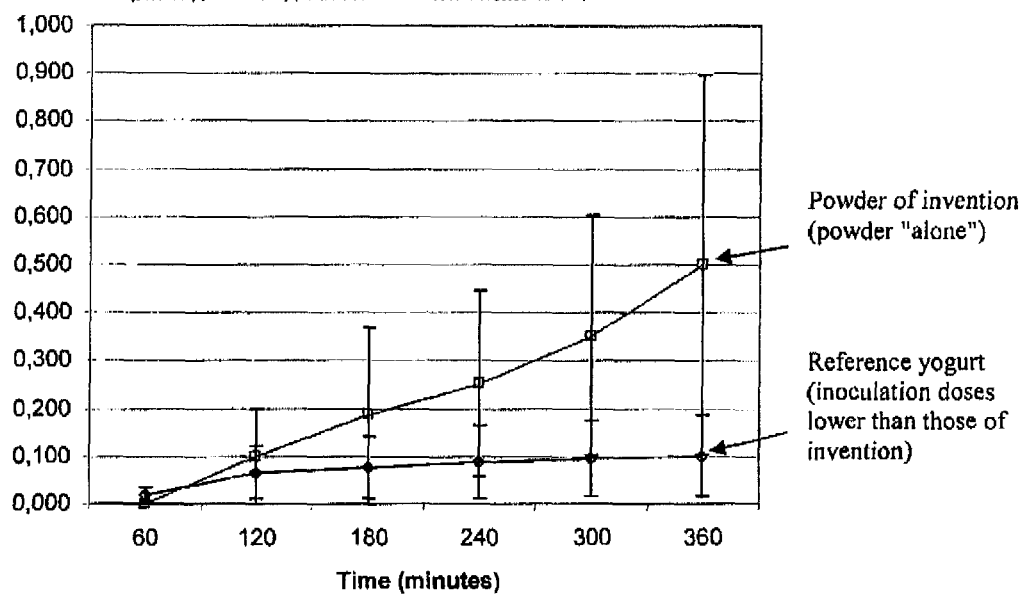

FIGS. 9 and 10 show the cumulative survival rates of ST (FIG. 9) and LB (FIG. 10) as a percentage of the initial dose after passage through the stomach and the small intestine.

FIG. 9 (ST): powder of the invention, alone or in filling (the three top curves), compared with a reference yogurt (bottom curve) obtained from inoculation doses lower than those recommended by the invention.

FIG. 10 (LB): powder of the invention-alone (top curve) compared with a reference yogurt (bottom curve) obtained from inoculation doses lower than those recommended by the invention.

Figure 11:
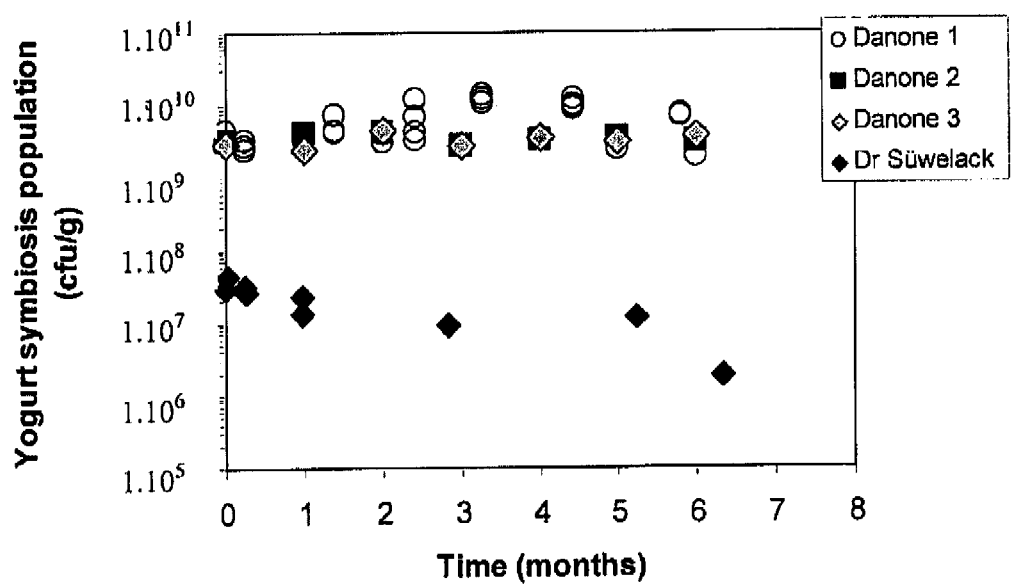

FIG. 11 shows the ST+LB survival rates measured during storage at a temperature of 20° C. of the powders of the invention ("Danone 1", "Danone 2" and "Danone 3"), and a commercially available powder ("Dr Süwelack"="Dr Süwelack M/A 5.4 Active").

DETAILED DESCRIPTION

The invention forming the subject matter of the present patent application provides a technical solution to produce:
- a fermented milk or yogurt with a high concentration of lactic ferments, in the viable or live form, without the need to add lactic bacteria which would not participate in lactic fermentation and/or which would be added subsequently to inoculation, and without the need to concentrate the fermented mass; and
- a fermented milk or yogurt with a high concentration of lactic ferments in a live or viable form which may be obtained from such a fermented milk or yogurt with a high concentration of lactic ferments and without adding lactic ferment(s) to the powder.

The powder of the invention per se can be designated a fermented milk or yogurt.

To this end, the present application proposes:
- the use of at least one strain of S. thermophilus and at least one strain of L. bulgaricus to ferment a dairy substrate;
- by inoculating said strains to a much higher level than that generally employed to manufacture yogurt;
- by preferably selecting strains of S. thermophilus which are brittle strains;
- by incorporating a non-negligible quantity of at least one strain of L. bulgaricus to develop a S. thermophilus-L. bulgaricus symbiosis;
- by drying the fermented milk or yogurt obtained under sufficiently mild conditions to maintain a total population of S. thermophilus and L. bulgaricus of at least $1 \times 10^7$ cfu/g, preferably at least $5 \times 10^8$ cfu/g, more preferably at least $1 \times 10^9$ cfu/g; and
- preferably, by drying the fermented milk or yogurt obtained until the powder obtained has a low Aw (activity water), preferably 0.3 or less, more preferably 0.25 or less, and still more preferably 0.2 or less.

As described below in more detail and illustrated in the accompanying comparative examples, the storage capacity of the powder of fermented milk or of yogurt is exceptional.

The metabolic characteristics of the powders of the invention are entirely equivalent to those of the reference yogurts.

The powders of the invention can be designated a yogurt not only because of their high live or viable ST and LB bacteria concentrations and because of the kinetic acidification kinetics monitored during lactic fermentation (see Example 4 and FIG. 4; see Example 1), but also because of their secondary metabolite contents, which are entirely equivalent to those of a reference yogurt (see Example 10).

When the process of the invention is followed, massive inoculation of the dairy substrate is carried out. This massive inoculation has the effect of resulting in a very limited growth of biomass compared with the cell growth which would be observed during the manufacture of conventional yogurts (conventional inoculation doses, which are lower than those of the invention).

The inventors have demonstrated that, in contrast to that which could be envisaged a priori, while the cell growth is considerably reduced, the fermentary activity is entirely equivalent or even better than that which may be observed during conventional yogurt fermentation.

The invention proposes and allows cell growth to be decoupled from fermentary activity.

The inventors have demonstrated that the metabolic characteristics of yogurts, fermented milks and also the powders of the invention are at least equivalent if not better than those which can be observed in a conventional yogurt.

The inventors have demonstrated that for certain secondary metabolites, such as folates (vitamin B9), the characteristics of the powders of the invention are even substantially superior to those of the reference yogurts (see Example 10).

Further, the metabolic characteristics of the powders of the invention, in particular its superior B9 vitamin characteristics, are preserved during storage of the powders of the invention over several months, for example at least 4 months at 20° C. (see Examples 12 and 13).

By comparison, a conventional yogurt cannot in general be stored for more than 48 hours at 20° C. without it becoming unsuitable for consumption.

As shown in particular in Examples 4 and 10, the invention demonstrates that the fact of carrying out bulk inoculation of the dairy substrate not only produces a fermentary metabolism in accordance with true ST+LB symbiosis, even though cell growth is much more limited than it would be at conventional inoculation doses, but it also demonstrates that the fermentary metabolism obtained is at least equivalent or even better than that which could be observed during conventional manufacture of yogurt or fermented milk.

The invention also demonstrates that combining said bulk inoculation with mild but extensive powderizing of yogurt or fermented milk which has been obtained by bulk inoculation of the dairy substrate can produce powders with a stability on storage, and in particular the stability on storage at ambient temperature, is excellent.

In the prior art, there exists a prejudice whereby extensive powderizing and more particularly powderizing to a very low Aw (water activity) could not result in satisfactory survival rates for *S. thermophilus* and *L. bulgaricus*.

In a preferred implementation, the invention proposes to challenge this prejudice by carrying out mild but very extensive powderizing and to combine this powderizing procedure with bulk inoculation of the dairy substrate.

The present application relates to a process for producing yogurt or fermented milk which can produce a yogurt or fermented milk with a high concentration of lactic ferments without it being necessary to add lactic bacteria which would not participate in lactic fermentation and/or which would be added post-inoculation and without it being necessary to concentrate the fermented mass.

The process for producing a yogurt or fermented milk of the invention comprises:
inoculating a dairy substrate which may have undergone a heat treatment at least equivalent to pasteurization, by inoculation of at least one strain of a high concentration of *Streptococcus thermophilus*, advantageously at a concentration of at least $5 \times 10^8$ cfu/g, and a high concentration of at least one strain of *Lactobacillus bulgaricus*, advantageously at a concentration of at least $1 \times 10^6$ cfu/g, to obtain an inoculated dairy substrate;
lactic fermentation of the inoculated substrate to obtain a fermented milk or a yogurt.

The present application also pertains to a process for producing a powder of fermented milk or of yogurt which can produce a powder with a high density of lactic ferments, without the need to add lactic bacteria which would not participate in lactic fermentation, and more particularly without the need to add lactic bacteria after initial inoculation of the liquid dairy substrate.

The process of the invention comprises:
inoculating a dairy substrate which may have undergone a heat treatment at least equivalent to pasteurization, by inoculation of a high concentration of at least one strain of *Streptococcus thermophilus*, advantageously at a concentration of at least $5 \times 10^8$ cfu/g, and a high concentration of at least one strain of *Lactobacillus bulgaricus*, advantageously at a concentration of at least $1 \times 10^6$ cfu/g, to obtain an inoculated dairy substrate;
lactic fermentation of the inoculated substrate to obtain a fermented milk or a yogurt;
powderizing of the fermented milk or yogurt obtained.

Advantageously, said powderizing is carried out under conditions, in particular temperature and/or duration and/or rate conditions, and more particularly temperature conditions, which can obtain survival rates for each of said strains of *S. thermophilus* and *L. bulgaricus* such that the powder obtained contains said at least one strain of *S. thermophilus* and said at least one strain of *L. bulgaricus* in a live or viable form at a concentration of at least $5 \times 10^8$ cfu/g and at least $1 \times 10^4$ cfu/g respectively.

In a preferred implementation, powderizing of the fermented milk or yogurt is carried out until a powder of fermented milk or yogurt which has an Aw (water activity) of 0.3 or less, more preferably 0.25 or less, and still more preferably 0.2 or less, is obtained, while ensuring that the powderizing conditions, in particular the temperature conditions applied, are sufficiently favourable to the survival of said strains of *S. thermophilus* and *L. bulgaricus* to obtain survival rates for each of said strains of *S. thermophilus* and *L. bulgaricus* such that the powder obtained contains said at least one strain of *S. thermophilus* and said at least one strain of *L. bulgaricus* in a live or viable form at a concentration of at least $5 \times 10^8$ cfu/g and at least $1 \times 10^4$ cfu/g respectively.

In order to produce a powder with a high concentration of lactic ferments, the process of the invention does not require a lactic bacterium to be added without it participating in lactic fermentation.

The process of the invention also does not require the fermented milk or yogurt to be concentrated to produce the desired high *S. thermophilus* and *L. bulgaricus* contents.

The process of the invention uses at least one dairy substrate, at least one strain of *S. thermophilus* and at least one strain of *L. bulgaricus*.

The term "dairy substrate" in the present application is intended to mean "milk" in the sense used in the dairy industry, i.e. a substrate essentially containing milk and/or milk components, and wherein the composition is such that the lactic fermentation of said dairy substrate by strains of *S. thermophilus* and *L. bulgaricus* results in a product which is intended for human consumption, and more particularly which can be designated a fermented milk or yogurt.

The term "dairy substrate" thus encompasses milk of animal origin in all its forms and all its compositional variations: skimmed or unskimmed milk, concentrated or non-concentrated milk, ultrafiltered or non ultrafiltered milk, fresh or non-fresh milk, powdered or non-powdered milk, reconstituted or non-reconstituted milk, recombined or non-recombined milk, enriched with milk constituents or otherwise, milk supplemented or not supplemented with processing agents or agents to enhance the quality of the finished product, such as flavors, aromas, sugars, etc.

The term "dairy substrate", however, does not include within its scope the meaning of "culture medium". The term "culture medium" envisages a medium intended to encourage and/or stimulate the growth of lactic bacteria and thus to produce an inoculum of lactic bacteria, while the term "dairy substrate" envisages a medium which is intended to undergo transformation by fermentation, to produce a food intended for human consumption. Thus, many compounds which may be added to a culture medium to stimulate and/or encourage the growth of lactic bacteria cannot be added to a dairy substrate to obtain a fermented milk or yogurt.

This is in particular the case:
with many surfactants and/or emulsifying agents and/or solubilizing agents and/or detergents, such as polyoxyethylene-sorbitan-20-monooleate (also known as polysorbate 80 or Tween 80);
citric acetic type acids;
meat extracts;
vegetable peptones;
glycerophosphate.

To carry out the process of the invention, a high concentration of at least one strain of S. thermophilus is inoculated into the dairy substrate. Advantageously, it is inoculated at a concentration of at least $5 \times 10^8$ cfu/g. Preferably, said at least one strain of S. thermophilus is inoculated into the dairy substrate at a concentration of at least $1 \times 10^9$ cfu/g, more preferably at least $2 \times 10^9$ cfu/g, more preferably at least $2.5 \times 10^9$ cfu/g, highly preferably at least $2.6 \times 10^9$ cfu/g, and still more preferably at least $2.7 \times 10^9$ cfu/g.

Preferably, said at least one strain of S. thermophilus is inoculated into the dairy substrate in a concentration in the range $1 \times 10^9$ cfu/g to $1 \times 10^{10}$ cfu/g (limits included).

In order to carry out the process of the invention, at least one strain of L. bulgaricus is inoculated into the dairy substrate. Advantageously, it is inoculated into the dairy substrate at a concentration of at least $1 \times 10^6$ cfu/g.

Preferably, said at least one strain of L. bulgaricus is inoculated into the dairy substrate at a concentration of at least $1 \times 10^7$ cfu/g, more preferably at least $1.1 \times 10^7$ cfu/g, still more preferably at least $1.2 \times 10^7$ cfu/g, highly preferably at least $1.3 \times 10^7$ cfu/g and still more preferably at least $1.4 \times 10^7$ cfu/g.

Preferably, said at least one strain of L. bulgaricus is inoculated into the dairy substrate in a concentration in the range $1 \times 10^7$ cfu/g to $5 \times 10^8$ cfu/g (limits included).

Once the dairy substrate is inoculated with a high concentration of said at least one strain of S. thermophilus and a high concentration of said at least one strain of L. bulgaricus, lactic fermentation is carried out using techniques which are known to the skilled person, so obtain a product which can be designated a fermented milk or yogurt.

The inoculated dairy substrate is thus maintained under conditions, in particular temperature conditions, which are favorable to the fermentation activity of said at least one strain of S. thermophilus and said at least one strain of L. bulgaricus, until a fermented milk or a yogurt is obtained. The initial pH of the dairy substrate is generally between 8 and 6, to drop by approximately two to 4 pH units and at the end of lactic fermentation to reach a final pH which is generally in the range 5 to 4 (generally, a pH of 4.7-4.6 for yogurts).

In the present application, all of the terms have the scope and significance which is usual in the dairy industry and/or the food industry.

Thus, when reference is made to a "lactic fermentation", this means an acidifying lactic fermentation which results in acidification following the production of lactic acid which may be accompanied by the production of other acids, carbon dioxide and various substances such as exopolysaccharides (EPS) or aromatic substances, for example diacetyl and acetaldehyde.

Similarly, the term "lactic ferment" means a live or viable micro-organism or a strain of micro-organisms which is capable of carrying out such acidifying lactic fermentation on a dairy substrate.

The term "fermented milks" and "yogurts" have the usual meanings attributed to them in the dairy industry, i.e. products which are intended for animal consumption, more particularly human consumption, and which are derived from acidifying lactic fermentation of a dairy substrate. Said products may contain secondary ingredients such as fruits, vegetables, sugars, flavors, etc.

The term "fermented milk" and "yogurt" satisfies strict official guidelines. Reference may in this case be made to the Codex Alimentarius (prepared by the Codex Alimentarius Commission under the aegis of the FAO and ODM content, and published by the Information Division of the FAO, available on-line at http://codesalimentarius.net; see in particular volume 12 of the Codex Alimentarius "Standards for milk and dairy products" and the "Codex Stan A-11(a)-1975" standard now referred to as the Codex Stan 243-2003).

In particular, reference may be made to French Law n° 88-1203 dated 30 Dec. 1988 relating to fermented milk and yogurt or yoghourt, published in the Official Journal of the French Republic on 31 December 1988. The contents of this Law are incorporated into the present application by reference.

Thus, a yogurt contains no lactic bacteria other than S. thermophilus and L. bulgaricus, while a fermented milk may contain other bacteria in addition to these two species.

The term "fermented milk" is thus reserved in the present application to the dairy product prepared with a dairy substrate which has undergone a treatment at least equivalent to pasteurization, inoculated with micro-organisms belonging to the characteristic species of each product. Coagulation of "fermented milk" cannot be, carried out by any means other than as a result of the activity of the micro-organisms used.

The term "yogurt" (yoghourt) is reserved for the fermented milk obtained, using standard methods, by the development of specific thermophilic lactic bacteria designated Lactobacillus bulgaricus (also designated Lactobacillus delbrueckii ssp bulgaricus) and Streptococcus thermophilus, which must be alive in the finished product, in an amount of at least $1 \times 10^7$ cfu of S. thermophilus and L. bulgaricus bacteria per gram of product, expressed as the lactic portion of the product. A product which can be designated a yogurt thus must contain at least one strain of S. thermophilus and at least one strain of L. bulgaricus in the live form in an amount of at least $1 \times 10^7$ cfu/g of the lactic portion.

"Yogurts" must not be coagulated by any means other than those which result from the activity of the micro-organisms employed.

A "fermented milk" or "yogurt" has not undergone any treatment which can subtract a constituent element of the dairy substrate employed, and in particular has not had the coagulum drained off.

A "fermented milk" or "yogurt" may be supplemented with one or more flavouring extracts, one or more natural flavors and, to a limit of 30 per 100 by weight of finished product, one or more sugars and other foodstuffs endowing a specific taste, for example cereals.

The incorporation of fat and/or protein substituents of non dairy origin is not allowed.

The quantity of free lactic acid contained in a fermented milk must not be less than 0.6 grams per 100 grams at the point of sale and the amount of protein material, expressed as the lactic portion, must not be less than that of normal milk.

The quantity of free lactic acid contained in a yogurt must not be less than 0.7 grams per 100 grams at the point of sale.

In accordance with the present invention, the fermented milk or yogurt produced by inoculation of said at least one strain of S. thermophilus and said at least one strain of L. bulgaricus will contain these strains in a concentration which is slightly higher than that at their inoculation.

A fermented milk or yogurt produced in accordance with the present invention will thus contain:
   said at least one strain of S. thermophilus at a concentration of at least $5\times10^8$ cfu/g, preferably at least $1\times10^9$ cfu/g, more preferably at least $2\times10^9$ cfu/g, more preferably at least $2.5\times10^9$ cfu/g, highly preferably at least $2.6\times10^9$ cfu/g and more preferably at least $2.7\times10^9$ cfu/g; and
   said at least one strain of L. bulgaricus at a concentration of at least $1\times10^7$ cfu/g, more preferably at least $1.1\times10^7$ cfu/g, more preferably at least $1.2\times10^7$, highly preferably at least $1.3\times10^7$ cfu/g, and still more preferably at least $1.4\times10^7$ cfu/g.

Preferably, a fermented milk or yogurt produced in accordance with the present invention will contain:
   said at least one strain of S. thermophilus in a concentration in the range $1\times10^9$ cfu/g to $1\times10^{10}$ cfu/g (limits included); and
   said at least one strain of L. bulgaricus in a concentration in the range $1\times10^7$ cfu/g to $5\times10^8$ cfu/g (limits included).

A yogurt or fermented milk of the invention comprises a high density of ST and LB in a live or viable form (ST and LB in the live form in contents as described in the application, for example a live ST content of $5\times10^8$ cfu/g or more and a live LB content of $1\times10^7$ cfu/g or more).

In one particular implementation of the invention, the yogurt or fermented milk produced also has a high dry matter content.

In the present application, the dry matter content or DM content corresponds to the mass of residual material measured after placing the product at 105° C. for 17 hours, with respect to the initial volume or to the initial mass of the product.

The DM content can be measured directly, i.e. by placing the product the DM content of which is to be determined at 105° C. for 17 hours and measuring the mass of residual material which contained the initial volume of the treated product.

A DM content may be measured indirectly, i.e. by measuring a parameter of the product from which the DM content may be deduced or estimated. As an example, the skilled person may measure the density of the product at a given temperature (for example at 45° C.) and deduce therefrom the corresponding DM content, for example using a chart or a correspondence curve which will already have been drawn up by the skilled person, to deduce, from the density measured at the given temperature, the DM content corresponding thereto for the product under consideration. In the products, such as the starting dairy substrate, indirect measurements such as densitometry are usually preferred as they can be carried out faster than the direct method.

A conventional dairy substrate has a DM content of the order of 10-20%, for example 11-13%. A yogurt or fermented milk obtained by lactic fermentation of such a conventional dairy substrate has a DM content which is not substantially different from that of the initial dairy substrate, i.e. a conventional DM content of the order of 10-20%.

In order to carry out the invention, a dairy substrate with a conventional DM content may be used.

In a particular implementation of the invention, yogurts or fermented milks are produced which, in addition to having high ST and LB contents as indicated herein, have a higher DM content than is conventional, and more particularly a DM content of 25% or more, for example 25-60%, preferably 28% or more, for example 28-55%, more preferably 30% or more, for example 30-45%, highly preferably 36-40%.

To produce such yogurts or fermented milks, ST and LB can be inoculated in the amounts required by the invention into a dairy substrate the DM content of which is not substantially different or which is close to that desired for the yogurt or fermented milk which will result from lactic fermentation of that substrate. So that the product obtained by lactic fermentation can always be designated a yogurt or fermented milk, clearly a dairy substrate with a DM content which is so high that the fermented product obtained could no longer be defined as a yogurt or fermented milk could be used, as it would be a different dairy product such as a cheese. Thus, it is recommended that a dairy substrate be selected with a DM content of not exceeding 60%, preferably 55%, more preferably 45%.

Thus, in a particular implementation of the invention, the dairy substrate employed could have a DM content of 25%-60%, preferably 28%-55%, more preferably 28-45%, still more preferably of the order of 30-45%, highly preferably 36-40%.

To increase the DM content of the yogurt or fermented milk, without in any way causing the product to lose its designation as a yogurt or fermented milk, the dairy substrate on which the ST+LB fermentation of the invention is to be carried out could be concentrated.

Thus, before ST and LB inoculation, the dairy substrate may be concentrated, for example by eliminating part of the water contained in the dairy substrate. This water elimination may be carried out by evaporation, for example by heating the dairy substrate until the desired DM content is obtained. The dairy substrate may thus be placed at one or more temperatures of the order of 40-90° C., for example by subjecting the dairy substrate to a temperature gradient from about 90° C. to about 50° C. or 40° C., as is the case, for example, when industrial evaporators are employed.

For safety, at least one sanitizing treatment of the dairy substrate may precede this concentration step, and/or be carried out after the concentration step but before inoculation of the ST and LB bacteria. Such a sanitizing treatment is a treatment of the dairy substrate intended to cleanse or stabilize it, by destroying or inhibiting all or part of the microbial agents which the dairy substrate might contain, and more particularly all microbial agents which may cause health problems in consumers, and preferably all or part of the microbial agents which might cause degradation of the foodstuff itself. Examples of such sanitizing treatments include a heat treatment which is at least equivalent to pasteurization (for example treatment at least equivalent to application of a temperature of at least 72° C. for at least 15 seconds, such as a temperature of 90° C. for 30 seconds before concentration of the substrate and/or a temperature of 75° C. for 15 seconds after concentration of the substrate).

To increase the DM content of the yogurt or fermented milk, without in any way causing the product to use its designation as a yogurt or fermented milk, at least one component which constitutes and increase of the DM content may be added to the dairy substrate intended for fermenting.

Since the product to be produced must satisfy the designation as a yogurt or fermented milk, reference should be made to the Codex Stan A-11(a)-1975 (now referred to as the Codex Stan 243-2003) and/or French Law n° 88-1203 to check that the component(s) envisaged to constitute an increase in DM content is (are) compatible with the definition of a yogurt or fermented milk. Thus, a component which could modify the texture and/or structure of the dairy substrate in too great a manner would be avoided, so that the fermented product obtained effectively retained the structure and texture of a yogurt or fermented milk.

Such a component is thus preferably a milk-derived product.

Such a component will preferably be low in proteins to limit coagulation problems.

Advantageously, a compound containing lactose will be selected, preferably a component which is rich in lactose, such as lactoserum, advantageously demineralised or sweet lactoserum (pH about 6.5) from which the lactose has not been eliminated.

If said at least one component added to increase the DM content is in the solid form, it represents a direct addition to the DM content.

In contrast, if said at least one component added to increase the DM content is in the liquid form, the fact that that component also adds water must be taken into account, so the resulting DM content cannot be much higher than that of the initial dairy substrate. This is, for example, generally the case when lactoserum is added to the initial dairy substrate in the liquid form. In such cases, the operation to add component(s) which increase the DM content will be followed by an operation for concentrating the dairy substrate by eliminating part of the water contained, as described above, for example by an evaporation operation.

It should be ensured that said at least one component added to increase the DM content is or has been treated so as to be free of any microbial agent which could cause health problems in consumers and preferably free of any microbial agent which could cause degradation of the foodstuff itself. Such sanitizing treatments in particular include a heat treatment at least equivalent to pasteurisation (for example treatment at least equivalent to application of a temperature of at least 72° C. for at least 15 seconds, such as a temperature of 90° C. for 30 seconds before concentration of the substrate and/or a temperature of 75° C. for 15 seconds after concentration of the substrate).

An example of a particular mode for carrying out the implementation comprises:

a) treatment of a dairy substrate (the composition of which is such that it allows said substrate to be designated a yogurt or fermented milk after lactic fermentation), so that it reaches a DM content of 25% or more and 60% or less, preferably 28% or more and/or 55% or less, more preferably 30% or more and/or 45% or less, highly preferably 36-40%, without losing the ability to be designated a yogurt or fermented milk once fermented, the treated dairy substrate being a dairy substrate with a high DM content;

said treatment of said dairy substrate may, for example, be carried out by:

i. concentration of the DM of the dairy substrate, for example by eliminating part of the water it contains, for example by evaporation; and/or by:

ii. adding to the dairy substrate at least one component which is intended to supply DM to the dairy substrate to be fermented, the nature of which is such that it does not deprive said dairy substrate of its capacity to be designated a yogurt or fermented milk once fermented;

b) optionally, heat treatment of the dairy substrate with a high DM content to cleanse or stabilize it by destroying or inhibiting all or part of the microbial agents which it may contain, and more particularly all microbial agents which may cause health problems in consumers, and preferably all or part of the microbial agents which may cause degradation of the foodstuff itself, for example by treatment of said substrate by heat treatment at least equivalent to pasteurization (for example treatment at least equivalent to application of a temperature of at least 72° C. for at least 15 seconds, for example a temperature of 90° C. for 30 seconds);

c) inoculation of said dairy substrate with a high DM content, which may have undergone a sanitizing treatment in step b), by at least one strain of ST and at least one strain of LB in high concentrations, in accordance with the invention, as described in the present application;

d) carrying out lactic fermentation to obtain yogurts or fermented milks (for a yogurt, the pH marking the end of fermentation is generally 4.8+0.5/−0.3 pH units, for example a pH of 4.8+0.4/−0.3, for example pH=4.8+/−0.3 pH units, for example pH 4.8+/−0.2 pH units, preferably a pH of 4.8+0.5/−0.1; for a fermented milk other than yogurt, the pH marking the end of fermentation is generally 4.6+/−0.2 pH units);

e) the yogurts or fermented milks obtained are then yogurts or fermented milks with high ST and LB concentrations and a high DM content, in accordance with the invention;

f) if desired, powderizing of the yogurts or fermented milks obtained to obtain a powder with populations of live or viable ST and LB which are in accordance with the invention, as described in the application.

The process may also comprise one or more sanitizing treatment(s) of the product concerned (i.e. on milk, said at least one component adding DM content and/or on said substrate or dairy "mix"), at any time that the skilled person considers appropriate, for example before and/or after step b) and/or before step c).

Such a sanitizing treatment is intended to destroy or inhibit all or part of the microbial agents that the product may contain, more particularly all of the microbial agents which may cause health problems in consumers, preferably all or part of the microbial agents which may cause degradation of the foodstuff itself, for example a treatment by a heat treatment at least equivalent to pasteurisation (for example, treatment at least equivalent to application of a temperature of at least 72° C. for at least 15 seconds, for example a temperature of 90° C. for 30 seconds).

One particular example of achieving a "yogurt with a high DM content" of the invention is presented in Example 12.

Once obtained, the yogurt or fermented milk with high ST and LB concentrations and high DM content of the invention may be sprayed as described in the application until a low Aw (water activity) is reached, preferably to obtain an Aw of 0.3 or less, more preferably 0.25 or less, preferably 0.2 or less, as described below. Drying must be sufficiently effective to reach the desired Aw and sufficiently mild to preserve the maximum amount of ST and LB bacteria in a live or viable form.

Figure 3:
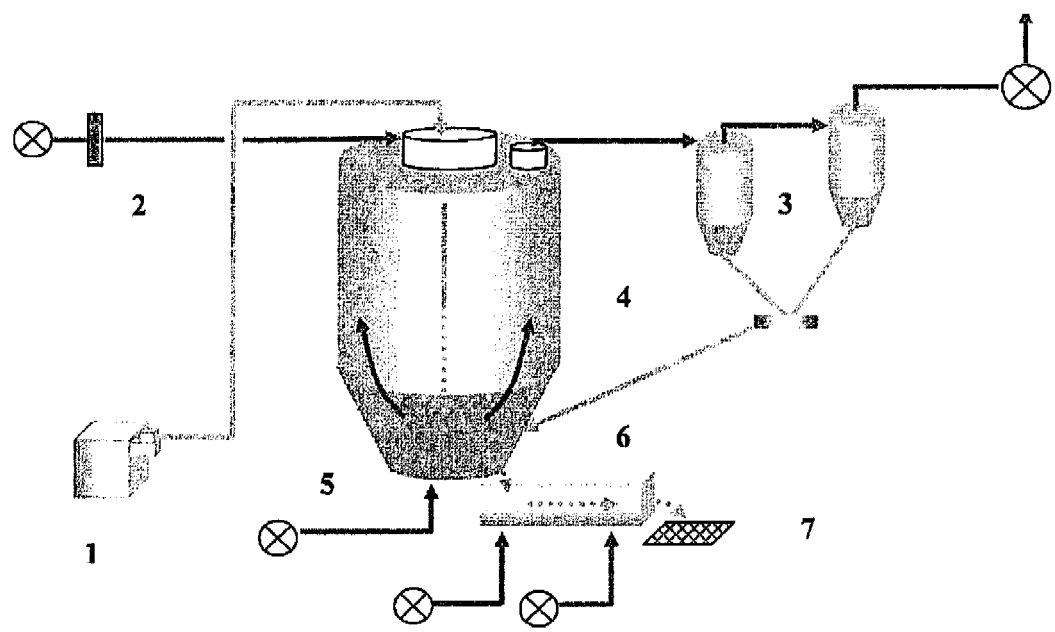
FIG. 3 shows a diagram of the gentle atomization device adapted to the production of a powder of the invention.

To carry out said powderizing, we proceed as described in the application for yogurts with a conventional DM content, for example using an atomization device corresponding to the scheme shown in FIG. 3, and/or as described in Example 3. Another example of drying is also shown in Example 9.

The fermented milk or yogurt obtained by lactic fermentation is then powderized under conditions which can obtain a certain survival rate of each of said strains of S. thermophilus and L. bulgaricus.

Powderizing of a fermented milk or a yogurt destroys the membrane integrity, and more generally kills part of the lactic bacteria present in the fermented milk or yogurt.

At the same time, powderizing concentrates the lactic bacteria since a powder is constituted by 95% to 99% dry matter, while the fermented milk or yogurt is a moist mass, the dry matter of which in general only represents 15% to 20% of its total mass.

Preferably, said powderizing is carried out so that said at least one strain of S. thermophilus is contained in the powder of the invention in a live or viable form in an amount of at least $5 \times 10^8$ cfu/g, more preferably at least $1 \times 10^9$ cfu/g, and more preferably at least $2 \times 10^9$ cfu/g, highly preferably at least $3 \times 10^9$ cfu/g.

Preferably, said powderizing is carried out so that said at least one strain of S. thermophilus is contained in the powder of the invention in a live or viable form in an amount in the range $1 \times 10^9$ cfu/g to $1 \times 10^{10}$ cfu/g (limits included).

Preferably, said powderizing is carried out so that said at least one strain of L. bulgaricus is contained in the powder of the invention in a live or viable form in an amount of at least $1 \times 10^4$ cfu/g, preferably at least $2 \times 10^4$ cfu/g, preferably at least $3 \times 10^4$ cfu/g, more preferably at least $4 \times 10^4$ cfu/g, highly preferably at least $8 \times 10^4$ cfu/g, highly preferably at least $1 \times 10^5$ cfu/g, still more preferably at least $3 \times 10^5$ cfu/g.

Preferably, said powderizing is carried out so that said at least one strain of L. bulgaricus is contained in the powder of the invention in a live or viable form in an amount in the range $1 \times 10^4$ to $1 \times 10^5$ cfu/g.

Any combination of S. thermophilus and L. bulgaricus content is included in the scope of the present patent application.

As an example, and advantageously, the fermented milk or yogurt obtained may be powderized under conditions which can obtain a survival rate of each of said strains of S. thermophilus and L. bulgaricus such that the powder obtained contains said at least one strain of S. thermophilus at a concentration of at least $5 \times 10^8$ cfu/g, preferably at least $1 \times 10^9$ cfu/g, and said at least one strain of L. bulgaricus in a live or viable form at a concentration of at least $1 \times 10^4$ cfu/g, preferably at least $4 \times 10^4$ cfu/g respectively.

The survival rate of said at least one strain of S. thermophilus and said at least one strain of L. bulgaricus depends on the nature of said strains, the type of powderizing process employed and the conditions, which may or may not be mild, under which this process is applied.

Powderizing of the fermented milk or yogurt will be sufficiently mild to keep each of the inoculated lactic ferments in a live or viable form as far as possible.

It may advantageously be a process by atomization with a gas flow (air) temperature such that the temperature of the product (powder) does not exceed 80° C., for example a gas flow (air) temperature of 190-210° C. Advantageously, said atomization is associated with complementary drying of granules in a fluidized bed; for example, an internal fluidized bed at the bottom of the atomization tower. Advantageously, the temperature of the air flow (air) for the fluidized bed (=outlet temperature, if this bed is inside the tower and at the bottom of the tower) is 100° C. or less, preferably 80° C. or less, more preferably 60° C. to 80° C., advantageously about 70° C. (see Example 3 below, and FIG. 3).

In the context of the present invention, powderizing preferably has a yield:
  of at least about 20% as regards said at least one strain of S. thermophilus, preferably at least 25%, more preferably at least 30%; and
  at least $2 \times 10^{-5}$% for said L. bulgaricus strain, preferably at least $5 \times 10^{-5}$%, more preferably at least 0.1%, highly preferably at least 0.5%.

Powderizing of the fermented milk or yogurt is carried out under sufficiently extensive drying conditions to produce a powder of fermented milk or yogurt with a low Aw (water activity).

Advantageously, powderizing of the fermented milk or yogurt is carried out under drying conditions producing a powder of fermented milk or of yogurt which, at the end of powderizing, has an Aw (water activity) measured at ambient temperature (temperature of 20-26° C., for example 25° C.) which is 0.3 or less, preferably 0.25 or less, highly preferably 0.25 or less, advantageously 0.2 or less. Preferably, said Aw will be 0.05 or more, preferably 0.09 or more. In a preferred implementation of the invention, said Aw will be 0.05-0.25, preferably 0.05-0.20, highly preferably 0.09-0.19, for example 0.10-0.19.

Powderizing of the fermented milk or yogurt is carried out by drying and physical transformation into the form of granules (=granulation).

The powderizing conditions are thus physical parameters which are applied to the fermented milk or yogurt to obtain the desired drying and granulation.

The parameters applied during powderizing can be adjusted by the skilled person to obtain the desired survival rate and the desired Aw. These adjustments can be carried out by trial and error applying the general knowledge of the skilled person.

Said parameters must have a sufficiently mild effect on cells of S. thermophilus and L. bulgaricus to have the desired survival rates, and at the same time have a sufficiently extensive effect to reach the desired Aw.

An essential parameter as regards survival of S. thermophilus and L. bulgaricus cells is the temperature(s) (or temperature gradient) which is (are) applied to dry the fermented milk or yogurt.

If powderizing causes water evaporation, the skilled person may select sufficiently low temperature(s) (or a sufficiently low or mild gradient) to reach the desired survival rates.

If powderizing involves water sublimation, the skilled person may select a sufficiently high temperature (or sufficiently low or gentle temperature gradient) to reach the desired survival rate. This (these) temperature(s) (or this temperature gradient) is/are applied for a period which is sufficiently long to reach the desired Aw.

The skilled person can then adjust these temperature parameters and the period to obtain the desired survival rate and Aw.

If powderizing is carried out by atomisation, drying and granulation are carried out at the same time in the atomisation tower.

If powderizing is carried out by freeze-drying, initial drying is carried out by freeze drying, followed by powderizing the cake obtained at the end of freeze drying to transform that cake into powder granules.

If desired or required, powderizing may comprise one or more complementary drying step(s), for example fluidized bed and/or vibrating bed drying. Preferably, said complementary drying step(s) is (are) carried out at a temperature of 25-80° C.

One such complementary drying step may be required when the granules obtained at the end of atomisation or, if appropriate, at the end of the freeze drying-granulation step, have the desired survival rate, but have not reached the desired Aw value. The powder granules may then be brought to a very mild temperature(s) which will complete drying of the granules until the desired Aw is achieved, without causing the *S. thermophilus* and *L. bulgaricus* concentrations to fall below the minimum amounts required. Given that at this stage, the granules are already formed, the temperature(s) applied as complementary drying step(s) may be very low, for example 25° c.-90° C.

As an example, powderizing may be carried out by freeze drying and granulation of the freeze dried cake, and may also comprise complementary drying in an external bed, for example an external vibrating bed.

As an example, powderizing may be carried out by atomisation (preferably, taking care that the temperature of the product does not exceed 80° C.), and may also comprise fluidized bed drying of powder granules which have been obtained by atomisation. Said fluidized bed is preferably an internal fluidized bed, at the bottom of the atomisation tower. Said complementary fluidized bed drying may advantageously be followed by external bed drying, for example an external vibrating bed (preferably at a temperature close to ambient temperature, for example 25-40° C.).

This type of complementary drying is a preferred implementation of the invention. In a preferred implementation of the invention, in addition to drying applied to form powder granules, powderizing thus comprises one or more complementary drying step(s) which is (are) applied to the powder granules which have already been formed.

The inventors have observed that it is more effective to form powder granules which have the desired survival rates, but without completely removing the water content, i.e. approaching it but not reaching the desired Aw, to stabilize the *S. thermophilus* and *L. bulgaricus* bacteria contained without subjecting them to too much stress, and to follow that granulation drying by a complementary granule drying step, preferably at temperature(s) of 25° C. to 85° C., for example in a fluidized bed (advantageously with an air temperature of 60° C. to 80° C.) and/or a vibrating bed (advantageously at a temperature of 25-40° C.).

In a preferred implementation of the invention, granulation is carried out by atomisation, and drying is three-point drying, such as:
  powderizing by atomization (preferably, ensuring that the temperature of the product does not exceed 80° C.); and
  drying the powder granules obtained by atomization on a fluidized bed, said fluidized bed preferably being an internal fluidized bed at the bottom of the atomization tower, said first complementary drying being followed by:
  drying in an external bed, for example an external vibrating bed (preferably at a temperature close to ambient temperature, for example 25-40° C.).

Examples of producing a powder in accordance with the invention are described in Example 1, and advantageous powderizing examples are described in Examples 3 and 9.

The powder of the invention has very good storage properties: the powder of the invention retains its initial appearance both as regards colour and texture, as well as its gustative properties, during storage of the powder for at least 4 months at 20° C. Further, the *S. thermophilus* and *L. bulgaricus* concentrations which are contained in the powder in a live or viable form remain high over time.

The powder of fermented milk or of yogurt of the invention retains at least $1 \times 10^7$ cfu/g of live or viable lactic ferments (total population of *S. thermophilus* and *L. bulgaricus* lactic ferments) after storage of said powder for six months at 20° C., without the addition of *S. thermophilus* or *L. bulgaricus*.

Advantageously, the powder of the invention does not suffer any detectable loss of *S. thermophilus* compared with the fermented milk or yogurt from which it derives, after storing for 4 months, or more, at a temperature of 20° C.

The fermented milk or yogurt of the invention advantageously retains:
  at least $5 \times 10^8$ cfu/g, preferably at least $1 \times 10^9$ cfu/g, of said at least one strain of *S. thermophilus* in a live or viable form; and
  at least $1 \times 10^4$ cfu/g of said at least one strain of *L. bulgaricus* in a live or viable form, preferably at least $2 \times 10^4$ cfu/g, preferably at least $3 \times 10^4$ cfu/g, more preferably at least $4 \times 10^4$ cfu/g, highly preferably at least $8 \times 10^4$ cfu/g, very preferably at least $1 \times 10^5$ cfu/g, still more preferably at least $3 \times 10^5$ cfu/g of said at least one strain of *L. bulgaricus* in a live or viable form;
after storage of said powder at 20° C. for four months, or more, without the addition of exogenous *S. thermophilus* or *L. bulgaricus*.

Advantageously, after 4 months at 20° C., the powders of the invention have at least $2 \times 10^8$ cfu/g of the total population of *S. thermophilus* and *L. bulgaricus* in a live or viable form. Most generally, this total population is at least $3.5 \times 10^8$ cfu/g, very frequently at least $4 \times 10^8$ cfu/g. This is particularly the case when the dairy substrate used to produce the yogurt or fermented milk has a conventional DM content, i.e. a DM content of 10% to 20%, for example 11-13%.

Particularly remarkably, in one implementation of the invention, the survival rate of the total population of *S. thermophilus* and *L. bulgaricus* contained in a powder of the invention is at least 80% after storing the powder for 4 months at a temperature of 20° C.

This is particularly the case when the dairy substrate used to produce the yogurt or fermented milk has a conventional DM content, i.e. a DM content of 10% to 20%, for example 11-13%.

Highly advantageously, after 6 months at 20° C., the powders of the invention comprise more than $1.0 \times 10^7$ cfu/g of the total *S. thermophilus* and *L. bulgaricus* population in a live or viable form, most generally at least $5 \times 10^7$ cfu/g. Frequently, this total population is at least $1 \times 10^8$ cfu/g, highly frequently at least $4 \times 10^8$ cfu/g. This is particularly the case when the dairy substrate used to produce the yogurt or fermented milk has a conventional DM content, i.e. a DM content of 10% to 20%, for example 11-13%.

Particularly remarkably, in one implementation of the invention, the survival rate of the total *S. thermophilus* and *L. bulgaricus* population contained in a powder of the invention is at least 75%, most generally at least 85%, after 6 months storage of the powder at a temperature of 20° C. This is in particular the case when the dairy substrate used to produce the yogurt or fermented milk from which the powder derives is a dairy substrate with a conventional DM content (10-20%).

The term "significant" is intended here in its statistical sense, and as used in the context of the dairy industry.

The term "significantly" as used here has its usual significance in the field of statistics (for example t test, z test, chi squared test, F ratio, etc), i.e. to compare one measured value with another, and to determine whether those measured values differ from each other. The term "significantly" thus accommodates the fact that the skilled person may take into account the standard deviation (if it exists), which measures the dispersion of the data in a frequency distribution. The desired value of p is normally placed at an alpha of 5%, or more rigorously at an alpha of 1%.

To the knowledge of the Applicant, prior art powders do not have such good storage properties (see Examples 12 and 13 below).

Means allowing the *S. thermophilus* and *L. bulgaricus* contents contained in a live or viable form to be measured in the powder are known to the skilled person. They include the official FIL 117B: 1997, yogurt method: enumeration of characteristic micro-organisms—a colony-count technique, at 37° C. The powder or, as is appropriate, filling, to be analyzed may be prepared for enumerating, as described in Example 5 below.

Said *S. thermophilus* and *L. bulgaricus* strains may be selected from those known by the skilled person as being capable of producing lactic fermentation on a dairy substrate, to produce a fermented milk or a yogurt.

One example of a *S. thermophilus* strain is the strain deposited with the CNCM with accession number I-2130 (date of deposit at CNCM: 24 Feb. 1999, by Compagnie Gervais-Danone).

One example of a strain of *L. bulgaricus* is the strain deposited with the CNCM with accession number I-1519 (date of deposit at CNCM: 30 Dec. 1994, by Compagnie Gervais-Danone).

Preferably, at least one strain of *S. thermophilus* and/or at least one stain of *L. bulgaricus* is selected which has/have a propagation capacity on a dairy substrate such that they can produce high density inoculation ferments, and more particularly ferments with a *S. thermophilus* and *L. bulgaricus* population of:

$3 \times 10^{10}$ cfu/g or more for *S. thermophilus*, $1 \times 10^9$ cfu/g or more for *L. bulgaricus*, for frozen ferments; or $1 \times 10^{11}$ cfu/g for *S. thermophilus*, $4 \times 10^9$ cfu/g for *L. bulgaricus*, for ferments in the freeze dried form.

The population of *S. thermophilus* and that of *L. bulgaricus* may be prepared and/or packed separately, or as a mixture. They may be contained in distinct granules, or may be contained in the same granule which accommodates both populations.

Advantageously, and in contrast to what is usually carried out to manufacture a fermented milk or yogurt, at least one *S. thermophilus* strain which produces few or no exopolysaccharides (EPS) is selected (brittle type strain).

Preferably, said at least one strain of *S. thermophilus* is thus a brittle type strain which produces no exopolysaccharides (EPS) or which produces EPS in such a small amount that a standard medium for milk fermentation, after culture of said strain at a temperature of 40° C. to a pH of 4.7, has a Casson viscosity at 4° C. which is 500 mPa·s or less, preferably 400 mPa·s or less.

A suitable milk based medium for such a viscosity measurement may simply be milk or a model fermented milk medium, such as a medium composed of 120 grams of skimmed milk powder, 1 gram of N3 peptide (Vitalarmor 950, Armor proteins), and permutated water up to a qsp of 1 L. Example 6 below describes a detailed example of the protocol. Conventional inoculation doses of *S. thermophilus* may be used (for example inoculating at 1% v/v), such as those described in Example 6.

One example of such a strain of *S. thermophilus* (brittle type *S. thermophilus*) is the *S. thermophilus* strain deposited with the CNCM with accession no I-2130.

To select a lactic ferment strain which produces few or no exopolysaccharides (EPS), any means known to the skilled person may be used. A suitable methodology comprises measuring the viscosity of the fermented milk obtained by fermentation of a dairy substrate using candidate strain(s), such as a yogurt produced using the candidate strain(s).

One method can determine whether the strain(s) used to ferment the milk provide(s) a fermented milk with a ropy texture (high viscosity), a texturing type (medium viscosity) or whether it produces a fermented milk with a brittle texture (low viscosity).

In the context of the present invention, and in contrast to the manufacture of a fermented milk or yogurt which is not intended for powderizing, the preferred lactic strains are those which produce a fermented milk with a brittle texture (low viscosity).

The method for measuring the viscosity of a fermented milk comprises using a refrigerated viscosimeter provided with a system which can apply an increasing and a decreasing shear gradient to the fermented milk, such as the Mettler RM® 260 refrigerated viscosimeter provided with a coaxial DIN 145 type system. This rotary system allows destructuring of the product to be observed as a function of a linear shear gradient, or a stress at a given gradient.

In brief, this method comprises:

inoculating the candidate lactic strain (or strains) on an appropriate culture medium, such as a milk based medium (milk, model fermented milk medium; see Example 6) after culture of said strain at a temperature of 40° C. to a pH of 4.7, has a Casson viscosity at 4° C. which is 500 mPa·s or less, preferably 400 mPa·s or less (if desired, several batches of fermented milk may be produced under identical conditions to provide several comparable samples);

if the fermented milk model(s) obtained is (are) set product(s), these fermented milk(s) is (are) preferably stirred manually for 1 minute using a spatula;

incubation for 30 minutes at 4° C. of said fermented medium(ia) or of at least one sample removed from the fermented medium(ia);

the viscosity measurements are carried out at 4° C. using a Mettler RM® 260 refrigerated viscosimeter provided with a coaxial DIN 145 type system.

A base medium appropriate for such a viscosity measurement may simply be milk or a model fermented milk medium such as a medium composed of 120 grams of skimmed milk powder, 1 gram of N3 peptide (Vitalarmor 950, Armor proteins) and permutated water to a qsp of 1 l. Example 6 below shows a detailed example of the protocol. Conventional *S. thermophilus* inoculation doses may be used (for example inoculating at 1% v/v), as described in Example 6.

The product is subjected to an increasing shear gradient of 0 to 20 s$^{-1}$ for 1 minute. This phase corresponds to a ramp-up. Next, it is subjected to a decreasing shear gradient from 20 to 0 s$^{-1}$ for 1 minute, corresponding to the ramp-down. The results are obtained in the form of a continuous flow curve with a ramp-up and ramp-down between 0 and 20 s$^{-1}$.

Figure 1:
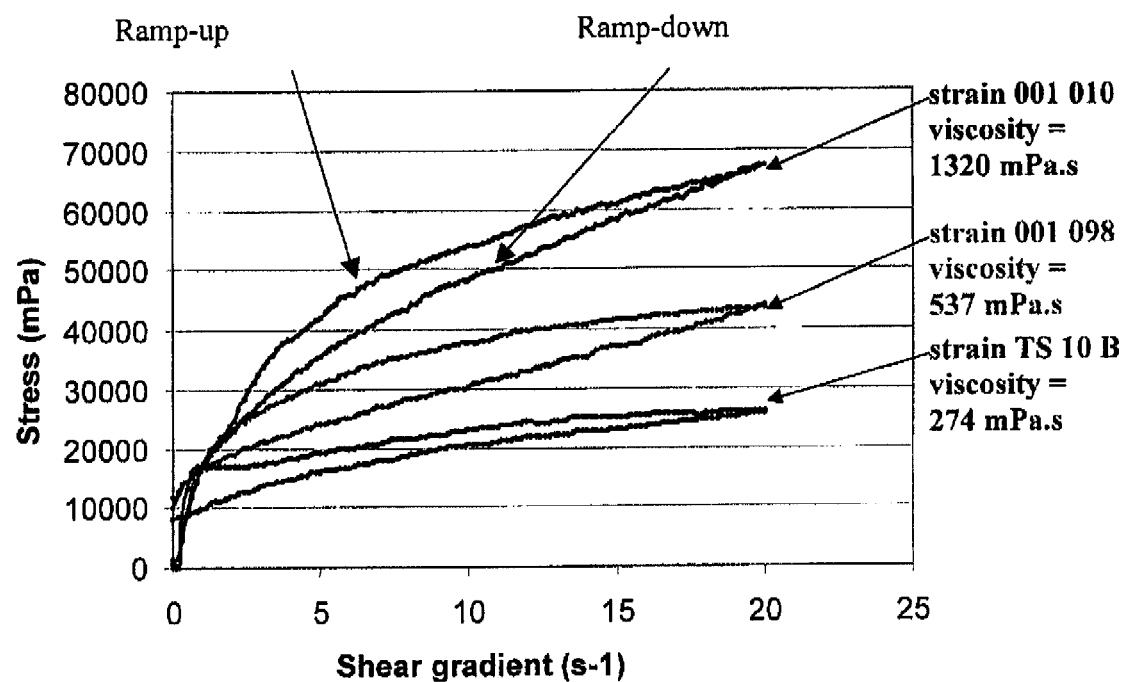
FIG. 1 shows the three major types of flow curves obtained by applying an increasing shear gradient then a decreasing shear gradient to a fermented milk model: top curve, high viscosity medium (ropy type lactic strains); middle curve, medium viscosity medium (texturing type lactic strains), lower curve, low viscosity medium (brittle type lactic strains).

FIG. 1 shows the three major types of flow curves:

the type of curve obtained using the *S. thermophilus* 001 010 strain corresponds to a strain which produces a fermented milk with a ropy texture (high viscosity, top curve);

the type of curve obtained using the S. thermophilus 001 098 strain corresponds to a strain which is of the texturing type (medium viscosity, middle curve);

the type of curve obtained using the S. thermophilus TS 10B strain (DSM Food Specialities Dairy Ingredients; BP 1; 2600 MA Delft; Netherlands) corresponds to a strain which produces a fermented milk with a brittle texture (low viscosity, bottom curve).

The tangent at any point of the descending flow curve represents the apparent viscosity of the fermented medium. This apparent viscosity varies depending on the shear gradient under consideration and it is preferable to adjust the curve using a mathematical model. Various appropriate mathematical models are known to the skilled person. Cassons model is one example of an appropriate model.

The viscosity of the fermented milk ($\eta$) is deduced from the slope of the regression line of the descending portion (descending shear gradient) of the flow curve obtained, modified to represent the square root of the stress as a function of the square root of the shear gradient.

Because of the heterogeneity of certain fermented milks (in particular with set products which must be manually stirred), and the design of certain viscosimeters, it is sometimes necessary to eliminate some spurious measurement points before mathematical modelling, such as spurious points which may be obtained during any change in the pinion intended to increase the shear rate.

It is sometimes necessary to eliminate part of the ascending curve corresponding to the transitional regime of getting the product in the gap into a laminar flow regime. Preferably, the adjustment is thus made to the descending curve where artifacts linked to thixotropy of the product and the start of the flow phase are less important.

Casson's model is formulated as follows (equation 1):

$$\sqrt{\tau} = \sqrt{\tau_0} + \sqrt{\eta \times D} \quad (1)$$

$\tau$=stress (Pa);
$\tau_0$=flow threshold of product (Pa);
$\eta$=viscosity of product (Pa·s)
D=shear gradient ($s^{-1}$).

This model is tracked by tracing the linear regression line over the descending portion of the curve; it reveals two important parameters:

the flow threshold of the product, $\tau_0$, corresponding to the origin of the ordinate;

the Casson's viscosity $\eta$ of the product, corresponding to the slope of the regression line.

Figure 2:
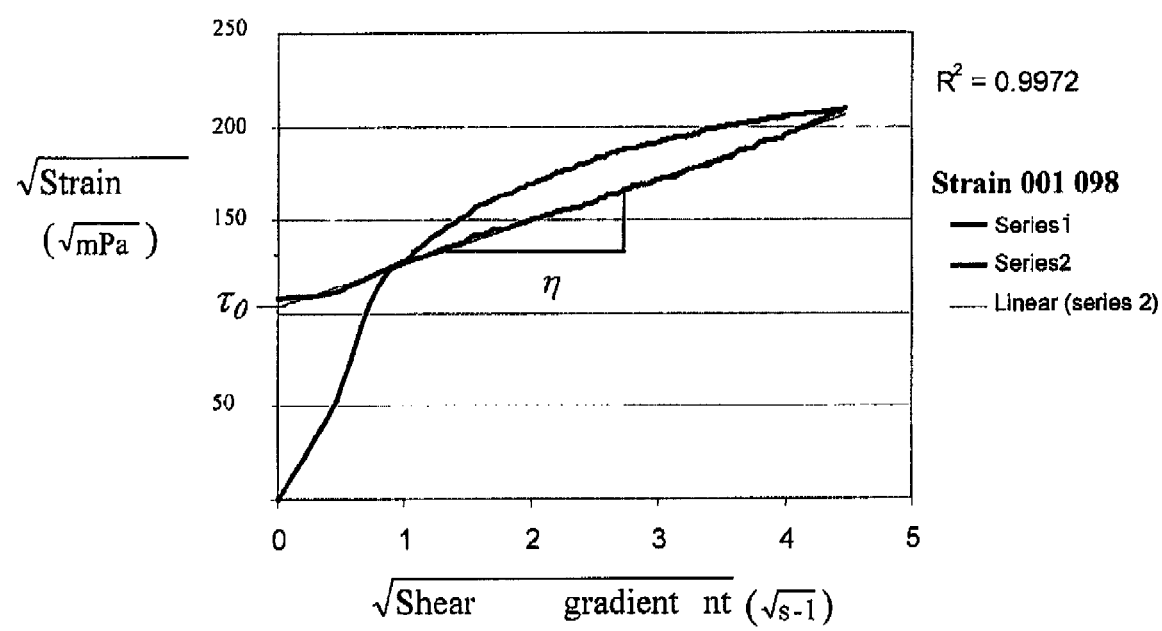
FIG. 2 illustrates the determination of the viscosity of a fermented milk model from the descending part of a flow curve obtained by application of an increasing then decreasing shear gradient (viscosity=slope of regression line of descending portion of the flow curve, with the square root of the shear gradient along the abscissa and the square root of the stress up the ordinate).

FIG. 2 shows the determination of the flow threshold $\tau_0$ and the viscosity $\eta$ of a fermented milk using strain 001 098 on the descending flow curve modelled by Casson.

Beyond 500 mPa·s, it is assumed that the Casson viscosity of the fermented milk is medium or high, i.e. the test strain(s) is (are) of the clearly texturing type, or endows a ropy texture.

When the Casson viscosity measured is 500 mPa·s or less, it is considered that the Casson viscosity is low, i.e. the test strain(s) provide a brittle texture. Preferably, strains has a Casson viscosity at 4° C. of 400 mPa·s or less are selected.

In the prior art, to produce a yogurt with a genuine food quality, strains of S. thermophilus designated texturing (strong EPS production) are preferably selected in order to obtain a yogurt which has a texture and taste which are satisfactory for the consumer.

The presence of brittle type S. thermophilus strains is nevertheless generally also necessary provided that health and safety considerations allow as rapid an acidification of the substrate as possible.

Thus, in selecting an appropriate combination of strains of brittle type S. thermophilus and texturing S. thermophilus strains, a yogurt may be produced which has a real food quality both as regards texture and as regards taste, as well as from a safety standpoint.

In the present invention, in contrast, brittle type S. thermophilus strains are selected, avoiding using a texturing type.

Further, in accordance with the present invention, it is not necessary, in order to obtain a finished quality (powder quality) product, to use a combination of S. thermophilus strain; in contrast, it is possible to limit the number of different S. thermophilus strains (one, two or three S. thermophilus strains) and the number of L. bulgaricus strains (one, two or three L. bulgaricus strains). The process of the invention can produce a high quality powder by using only a single strain of S. thermophilus (and clearly at least one L. bulgaricus strain). This S. thermophilus strain is preferably of the brittle type. In accordance with the present invention (process for producing yogurt or fermented milk, process for producing powder, ferments, inoculated dairy substrate, fermented milk or yogurt obtained, powder of fermented milk or of yogurt obtained, foods, such as filling, biscuits, confectionery), a single strain of S. thermophilus may be used, which is preferably of the brittle type, and preferably a single stain of L. bulgaricus is used.

The powder of the invention may have any granulometry which is suitable for its end use. A granulometric distribution in the range 10 to 300 micrometers is preferably selected for an industrial dairy or biscuit or confectionery application.

The present invention also relates to the starting products, to intermediate products and to the end products which may be used or obtained by carrying out the process of the invention.

Each of the characteristics given in the present application describing the process of the invention may be applied mutatis mutandis to the starting products, the intermediate products and the end products of the invention.

A starting product which may be used in a process of the invention consists of one or more concentrated ferments of lactic bacteria. The concentrated ferments can readily supply the large doses of inoculum required by the process of the invention.

The concentrated ferments of the invention comprise at least one strain of S. thermophilus, and/or at least one strain of L. bulgaricus.

The concentrated ferments of the invention may be in the form of frozen concentrates, for example in the form of frozen granules, and/or in the form of freeze dried concentrates.

The frozen concentrates of the invention comprise at least one strain of S. thermophilus (live or viable) at a concentration of at least $3 \times 10^{10}$ cfu/g, and/or at least one strain of L. bulgaricus (live or viable) at a concentration of at least $1 \times 10^9$ cfu/g.

The freeze dried concentrates of the invention comprise at least one strain of S. thermophilus (live or viable) at a concentration of at least $1 \times 10^{11}$ cfu/g and/or at least one strain of L. bulgaricus (live or viable) at a concentration of at least $4 \times 10^9$ cfu/g.

The concentrated ferments of the invention are obtained by massive inoculation of a substrate which is a culture medium (intended for cell propagation). One example of an implementation of frozen concentrates (in the form of granules) is described in Example 2 below.

This culture medium generally comprises milk and/or milk components, but also will generally comprise one or more agents or substances intended to encourage and/or stimulate the growth of the inoculated strain or strains.

In general, a culture medium intended for the manufacture of the concentrated ferments of the invention will also contain yeast extract and/or lysed yeasts and/or manganese sulphate and/or magnesium sulphate and/or peptones.

A culture medium intended for the manufacture of the concentrated ferments of the invention could comprise one or more surfactants and/or emulsifying agents and/or solubilizing agents and/or detergents such as polyoxyethylene-sorbitan-20-monooleate (also known as polysorbate 80 or Tween® 80)

A culture medium intended for the manufacture of concentrated ferments of the invention could comprise compounds which are not of dairy origin, such as meat extracts.

Preferably, said at least one strain of S. thermophilus contained in a concentrated ferment of the invention is a strain of S. thermophilus of the brittle type which produces no exopolysaccharides (EPS) or which produces EPS in such a small amount that a standard medium for milk fermentation (milk, or model fermented milk medium; see Example 6), after culture of that strain at a temperature of 40° C. to a pH of 4.7, has a Casson viscosity at 4° C. which is 500 mPa·s or less, preferably 400 mPa·s or less.

An appropriate milk based medium for such a viscosity measurement may simply be milk or a model fermented milk medium such as a medium composed of 120 grams of skimmed milk powder, 1 gram of N3 peptide (Vitalarmor 950, Armor proteins), and permutated water up to a qsp of 1 L. Example 6 below describes a detailed example of the protocol. Conventional S. thermophilus inoculation doses may be used (for example inoculating at 1% v/v), as described in Example 6.

Advantageously, said at least one strain of S. thermophilus is the stain of S. thermophilus deposited at the CNCM with accession number I-2130.

Any L. bulgaricus strain which the skilled person considers to be appropriate may be used. As an example, the strain deposited with the CNCM with accession number I-1519 may be used.

The cultivated dairy substrate which can be obtained as an intermediate product when carrying out the process for producing a yogurt or fermented milk of the invention and/or when carrying out the powder production process of the invention is also encompassed by the subject matter of the invention. It will be recalled that the term "dairy substrate" as used in the present application is intended to signify milk as defined in the dairy industry, i.e. milk of animal origin in all of its forms and in all variations of composition. A milk substrate of the invention is thus essentially composed of milk so that it can produce, by lactic fermentation, a product which can be designated a fermented milk or yogurt, intended for human food. The scope of the term "dairy substrate" does not include a culture medium.

The yogurt or fermented milk which can be obtained as an end product of the process for producing yogurt or fermented milk of the invention and/or as an intermediate product in the process for producing a powder of the invention also falls within the scope of the present patent application. Said fermented milk or yogurt may be produced by lactic fermentation of the inoculated substrate of the invention.

More particularly, the present patent application concerns a dairy substrate inoculated with at least one strain of S. thermophilus at a concentration of at least $5 \times 10^8$ cfu/g and by at least one strain of L. bulgaricus at a concentration of at least $1 \times 10^8$ cfu/g. Naturally, all of the S. thermophilus and/or L. bulgaricus concentrations described in the present application in the context of the description of the process of the invention are applicable to the intermediate product, inoculated milk substrate and to the product; and all combinations of concentrations are included in the scope of the present invention.

Preferably, the milk substrate comprises said at least one strain of S. thermophilus at a concentration of at least $1 \times 10^9$ cfu/g.

Preferably, said at least one strain of S. thermophilus contained in an inoculated milk substrate of the invention is a strain of S. thermophilus of the brittle type, which produces no exopolysaccharides (EPS) or which produces EPS in such a small amount that a standard medium for milk fermentation (milk or medium for model fermented milk; see Example 6), after culture of said strain at a temperature of 40° C. to a pH of 4.7, has a Casson viscosity at 4° C. which is 500 mPa·s or less, preferably 400 mPa·s or less.

A suitable milk based medium for such a viscosity measurement may simply be milk or a model fermented milk medium such as a medium composed of 120 grams of skimmed milk powder, 1 gram of N3 peptide (Vitalarmor 950, Armor proteins), and permutated water up to a qsp of 1 L. Example 6 below describes a detailed example of the protocol. Conventional S. thermophilus inoculation doses may be used (for example inoculating at 1% v/v) as described in Example 6.

Advantageously, said at least one strain of S. thermophilus is the S. thermophilus strain deposited at the CNCM with accession number I-2130.

Any strain of L. bulgaricus that the skilled person considers appropriate may be used. As an example, the strain deposited with the CNCM with accession number I-1519 may be used.

In a particular implementation of the invention, said inoculated dairy substrate of the invention is an inoculated dairy substrate which has a high DM content as described above (see also Example 8), i.e. an inoculated dairy substrate which has a DM content of the order of 25% to 60% as described above.

Advantageously, an inoculated dairy substrate of the invention has a composition such that after lactic fermentation using at least one strain of S. thermophilus and at least one strain of L. bulgaricus, the inoculated dairy substrate produces a dairy product which can be designated a yogurt or fermented milk.

Another product which may be obtained when carrying out a process in accordance with the invention is a fermented milk or yogurt which is obtained by lactic fermentation of the inoculated dairy substrate.

Overall, it has the same characteristics as the seed substrate in terms of concentrations and natures of S. thermophilus and L. bulgaricus.

Naturally, the fermented milk or yogurt which can be obtained when carrying out the process of the invention has L. bulgaricus and S. thermophilus concentrations which are slightly higher than those of the inoculated dairy substrate from which it derives; and, following coagulation of the casein produced during symbiotic lactic fermentation, it turns into a gel, as is the case with conventional yogurts. The exceptional concentration of lactic bacteria observed at the end of fermentation could not have been obtained with conventional inoculating ratios employed for prior art yogurts.

More particularly, a fermented milk or yogurt which can be obtained as an intermediate product when carrying out the powder production process of the invention (end product in the process for producing yogurt or fermented milk of the invention) comprises at least one strain of S. thermophilus at a concentration of at least $5 \times 10^8$ cfu/g, and by at least one strain of L. bulgaricus at a concentration of at least $1 \times 10^7$ cfu/g. Naturally, any quantity and combination of quantities of S. thermophilus and/or L. bulgaricus described in the present application in the context of the description of the process of the invention is applicable to the intermediate product, fermented milk or yogurt produced. Preferably, the fermented milk or yogurt comprises said at least one stain of S. thermophilus at a concentration of at least $1 \times 10^9$ cfu/g.

Preferably, said at least one strain of S. thermophilus contained in a fermented milk or yogurt which can be obtained as an intermediate product in the process for producing the powder of the invention is a strain of brittle type S. thermophilus which does not produce exopolysaccharides (EPS) or which produces EPS in such a small amount that a standard medium for milk fermentation (milk or model fermented milk medium; see Example 6) after culture of said strain at a temperature of 40° C. to a pH of 4.7, has a Casson viscosity at 4° C. which is 500 mPa·s or less, preferably 400 mPa·s or less.

An appropriate milk based medium for such a viscosity measurement may simply be milk, or a model fermented milk medium such as a medium composed of 120 grams of skimmed milk powder, 1 gram of N3 peptide (Vitalarmor 950, Armor proteins), and permutated water up to a qsp of 1 L. Example 6 below describes a detailed example of the protocol. Conventional S. thermophilus inoculation doses may be used (for example inoculating at 1% v/v), as described in Example 6.

Advantageously, said at least one strain of S. thermophilus is the strain of S. thermophilus deposited at the CNCM with accession number I-2130.

Any strain of L. bulgaricus which the skilled person considers appropriate may be used. As an example, the strain deposited at the CNCM with accession number I-1519 may be used.

Advantageously, an inoculated dairy substrate or a fermented milk or yogurt of the invention comprises a single strain of S. thermophilus which is preferably of the brittle type, and a single strain of L. bulgaricus.

In a particular implementation of the invention, said yogurt or fermented milk is a yogurt or fermented milk which has a high DM content as described above (see also Example 8), i.e. a yogurt of fermented milk with a DM content of the order of 25% to 60%, as described above.

Because of the bulk inoculation recommended in the invention, the yogurts or fermented milks of the invention have a L. bulgaricus/S. thermophilus ratio which is more favorable to L. bulgaricus than that observed using lower inoculation doses as is usual in the prior art.

A yogurt or fermented milk of the invention thus differs from a conventional yogurt at least in the value of the L. bulgaricus/S. thermophilus ratio.

In another particular implementation, a yogurt or fermented milk of the invention contains said at least one strain of L. bulgaricus in a ratio of 1 cfu per 40 to 60 cfu of said at least one strain of S. thermophilus, preferably in a ratio of 1 cfu per 45 to 55 cfu of said S. thermophilus strain, more preferably in a ratio of 1 cfu per 47 to 53 cfu of said strain of S. thermophilus, highly preferably in a ratio of 1 cfu per 48 to 52 cfu of said strain of S. thermophilus, more preferably in a ratio of 1 cfu per 48 to 51 cfu of said strain of S. thermophilus.

This is particularly the case when starting with inoculation doses of L. bulgaricus (LB) and S. thermophilus (ST) which are in a proportion of at most 1 LB per 50 ST, advantageously at most 1 LB per 100 ST, preferably at most 1 LB per 500 ST, highly preferably 1 LB per 100-300 ST, and most preferably 1 LB for about 200 ST.

By comparison, starting from the same ST/LB inoculation ratio, a conventional prior art yogurt (obtained with inoculation doses which are lower than those recommended in the invention) has a ratio of approximately 1 cfu of L. bulgaricus per 100 cfu of S. thermophilus.

As shown in Example 10, a yogurt or fermented milk of the invention has certain metabolic characteristics, in particular a folates content, which is higher than those of a conventional yogurt.

In a particular implementation of the invention, said yogurt or fermented milk has both a high DM content and a LB/ST ratio as described above.

A final product obtained in accordance with the invention is the powder of fermented milk or of yogurt.

Preferably, said at least one strain of S. thermophilus is contained in the powder of the invention in a live or viable form in an amount of at least $5 \times 10^8$ cfu/g, preferably at least $1 \times 10^9$ cfu/g, more preferably at least $2 \times 10^9$ cfu/g, highly preferably at least $3 \times 10^9$ cfu/g.

Preferably, said at least one strain of S. thermophilus is contained in the powder of the invention in a live or viable form in an amount in the range $1 \times 10^9$ cfu/g to $1 \times 10^{10}$ cfu/g (limits included).

Preferably, said at least one strain of L. bulgaricus is contained in the powder of the invention in a live or viable form in an amount of at least $1 \times 10^4$ cfu/g, preferably at least $2 \times 10^4$ cfu/g, preferably at least $3 \times 10^4$ cfu/g, more preferably at least $4 \times 10^4$ cfu/g, more preferably at least $8 \times 10^4$ cfu/g, highly preferably at least $1 \times 10^5$ cfu/g, more preferably at least $3 \times 10^5$ cfu/g.

Preferably, said at least one strain of L. bulgaricus is contained in the powder of the invention in a live or viable form in an amount in the range $1 \times 10^4$ to $1 \times 10^5$ cfu/g.

All combinations of S. thermophilus and L. bulgaricus concentrations are encompassed in the scope of the present patent application.

More particularly, a milk powder of the invention advantageously comprises at least one strain of S. thermophilus in a live or viable form at a concentration of at least $5 \times 10^8$ cfu/g, preferably at least $1 \times 10^9$ cfu/g, and at least one strain of L. bulgaricus in a live or viable form at a concentration of at least $1 \times 10^4$ cfu/g.

This high concentration of S. thermophilus and L. bulgaricus is obtained without the need to enrich the yogurt or fermented milk to be powderized. In fact, the process of the present invention proposes the production of a yogurt or fermented milk which is already itself highly concentrated in S. thermophilus and L. bulgaricus.

The powder of the invention has the advantage of itself being capable of being designated a yogurt or fermented milk:
 it contains much more than the minimum concentration of live or viable lactic bacteria (this minimum legal quantity is $1 \times 10^7$ cfu/g); and
 it results from symbiosis between S. thermophilus and L. bulgaricus (see Example 3).

In addition to the advantage of itself constituting a particularly rich source of live L. bulgaricus and L. bulgaricus, the powder of the invention has the advantage of having storage properties which are particularly remarkable.

In the powder of the invention, no substantial reduction in the population of S. thermophilus and L. bulgaricus in a live or viable form is observed after storage for 4 months at 5° C. or at 20° C.

Compared with a fermented milk or yogurt from which it derives, a powder of the invention does not suffer any detectable loss of S. thermophilus in a live or viable form, after storage for 4 months or longer, at a temperature of 20° C.

Advantageously, after 4 months at 20° C., the powders of the invention have a total population of S. thermophilus and L. bulgaricus of at least $2 \times 10^8$ cfu/g in a live or viable form. Most generally, this total population is at least $3.5 \times 10^8$ cfu/g, very frequently at least $4 \times 10^8$ cfu/g. This is particularly the case when the dairy substrate used to produce the yogurt or fermented milk has a conventional DM content, i.e. a DM content of 10% to 20%, for example 11-13%.

Particularly remarkably, in one implementation of the invention, the survival rates of the total population of S. thermophilus and L. bulgaricus contained in a powder of the invention is at least 80% after storing the powder for 4 months at a temperature of 20° C.

This is particularly the case when the dairy substrate used to produce the yogurt or fermented milk has a conventional DM content, i.e. a measure of 10% to 20%, for example 11-13%.

Highly advantageously, after 6 months at 20° C., the total population of S. thermophilus and L. bulgaricus in a live or viable form in the powders of the invention is more than $1.0 \times 10^7$ cfu/g, most generally at least $5 \times 10^7$ cfu/g. Frequently, this total population is at least $1 \times 10^8$ cfu/g, very frequently at least $4 \times 10^8$ cfu/g. This is the case in particular when the dairy substrate used to produce the yogurt or fermented milk has a conventional DM content, i.e. a DM content of 10% to 20%, for example 11-13%.

Particularly remarkably, in one implementation of the invention, the survival rates of the total S. thermophilus and L. bulgaricus population contained in a powder of the invention is at least 75%, more generally at least 85% after storing the powder at a temperature of 20° C. for 6 months. This is particularly the case when the dairy substrate used to produce the yogurt or fermented milk from which the powder derives is a dairy substrate with a conventional DM content (10-20%).

By comparison, commercial powders tested under the same experimental conditions by the inventors exhibit a population decrease which is detectable over a scale of a month. By way of example, the survival rates of commercial powders are in the range 47% (Dr Süwelack M/A 5.4 Active) and 74% (EPI PY 48) after 1 month at 20° C.

These unexpected properties and advantages of the powder of the invention are illustrated in Examples 12 and 13 below.

When the powder of the invention is stored at 5° C. or at 20° C. for 6 months, the amount of live or viable S. thermophilus and L. bulgaricus (total concentration) does not drop below the legal minimum quantity of $1 \times 10^7$ cfu/g. In fact, in a powder of the invention, the live or viable S. thermophilus and L. bulgaricus (total) concentration cannot drop below $5 \times 10^8$ cfu/g after storing for 6 months at 20° C.

The powder of the invention has microbiological characteristics which mean that it can be designated a yogurt or fermented milk.

Preferably, said at least one strain of S. thermophilus contained in the powder of the invention is a strain of brittle type S. thermophilus which produces no exopolysaccharides (EPS), or which produces EPS in such a small amount that a standard medium for milk fermentation (milk or a model fermented milk medium; see Example 6) after culture of said strain at a temperature of 40° C. to a pH of 4.7 has a Casson viscosity at 4° C. which is 500 mPa·s or less, preferably 400 mPa·s or less.

An appropriate milk based medium for such a viscosity measurement may simply be milk or a model fermented milk medium such as a medium composed of 120 grams of skimmed milk powder, 1 gram of N3 peptide (Vitalarmor 950, Armor proteins), and permutated water up to a qsp of 1 L.

Example 6 below describes a detailed example of the protocol. Conventional inoculation doses of S. thermophilus could be used (for example inoculating at 1% v/v), as described in Example 6.

Advantageously, said at least one strain of S. thermophilus is the strain of S. thermophilus deposited with the CNCM with accession number I-2130.

Any L. bulgaricus strain which the skilled person considered appropriate may be used. As an example, the strain deposited with the CNCM with accession number I-1519 may be used.

As indicated in the section on the processes of the invention, if desired, the number of strains of S. thermophilus and L. bulgaricus comprised in the powder of the invention may be limited, preferably to a minimum.

A powder of the invention may comprise a single strain of S. thermophilus which is preferably of the brittle type, and a single strain of L. bulgaricus.

Advantageously, the powder of fermented milk or of yogurt of the invention has an Aw (water activity) at ambient temperature (temperature between about 20° C. and 26° C., for example about 25° C.) of 0.3 or less, preferably 0.25 or less, highly preferably less than 0.25, advantageously 0.2 or less. Preferably, said Aw is 0.05 or more, preferably 0.09 or more. In a preferred implementation of the invention, this Aw is 0.05-0.25, preferably 0.05-0.20, highly preferably 0.09-0.19, for example 0.10-0.19.

The Aw of a powder of the invention or a food comprising a powder of the invention, such as a filling of the invention, may be measured using a dew point hygrometer such as a hygrometer from Aqualab® sold by DECAGON DEVICES, Pullman, Wash., USA.

The present application also pertains to any composition or product containing at least one powder of the invention.

More particularly, the present application pertains to any food product containing at least one powder of the invention.

The yogurt powder produced in accordance with the invention can readily be incorporated into an anhydrous filling formulation.

Regarding food products, the present application more particularly envisages a food filling which contains at least one powder of the invention.

The inventors have observed that when the powder of the invention is dispersed and/or incorporated into a fatty and essentially anhydrous filling, the survival rate of the strains of lactic ferments present is not significantly different from that observed when the powder is stored alone (pure powder, not in a mixture).

The food filling of the invention is thus preferably an essentially anhydrous filling.

The term "essentially anhydrous filling" means a concentrated suspension of powders and solid particles in a continuous phase composed of fats which are crystalline to a greater or lesser extent. The term "filling" in particular encompasses different types of chocolates (dark, milk and white) and icings.

An advantageous example of an essentially anhydrous filling is a fatty filling. A fatty and essentially anhydrous filling is constituted by hydrophilic powders dispersed in a continuous phase composed of a mixture of fats with a greater or lesser crystalline content. The quantity of water in an anhydrous filling is only that associated with the hydrophilic powders employed. This amount is less than about 2% to 3%, but is not entirely zero, hence the expression "essentially anhydrous fatty filling".

A filling of the invention may be contained in and/or on the food product, for example a biscuit, or confectionery.

The texture of a filling depends on:
1) the physical state of the continuous phase (melted or crystalline fats);
2) the volume fraction occupied by the particles;
3) their granulometric distribution; and
4) whether emulsifiers are present—surfactant molecules which lubricate interactions between the solid particles.

When the fat content is more than 40% and the granulometry of the powders is broadly over a micron, the first factor predominates. The physical state of the continuous phase is a function of the nature of the fats (in particular their saturated triglycerides content) and of the temperature. Thus, it is possible to formulate a filling in the form of a liquid which is fluid at 40° C. and a hard brittle solid at 20° C.

This change of state of the filling induced by temperature means that it has many applications, which can be divided into 3 major categories:

1—Sandwich" application, i.e. in the form of a layer deposited between two broadly cereal bases, such as:
1.1—dry biscuits with a round shape such as Lu's "Prince" or rectangular such as Lu's "Petit Ecolier", or square;
1.2—wafers, in which case several fine layers of filling and cereal base are superimposed to obtain the final product.

A typical formulation for this type of application is as follows:

TABLE 1

| Ingredient | % in filling (% w/w) |
| --- | --- |
| Vegetable fat (hydrogenated copra 32) | 43.9% |
| Dextrose | 7.2% |
| Icing sugar | 37.2% |
| Mild lactoserum | 1.5% |
| Yogurt powder of invention | 10.2% |
| Total | 100% |

The vegetable fats are a mixture of palm, hydrogenated copra and hydrogenated palm nut in proportions from 0 to 100%.

A typical production process is as follows:
The filling is produced by dispersing the powders and partially crystalline fats in a Hobbart type mixer at a temperature of about 30° C. A mixing time of 5 minutes at high speed is sufficient to obtain a homogeneous mixture with a relatively fluid consistency. This filling is then sent in thermostatted lines to a Manifold type metering device. A given volume of filling is deposited on the surface of a biscuit, and a second biscuit is then positioned on the filling surface. The sandwich then passes into a cooling tunnel where it is chilled at about 1° C./min to an outlet temperature of the order of 18° C.; the sandwich is then sufficiently integrated and cohesive to be packaged.

2. Application to the surface of a cereal product as a uniform layer:
2.1—The filling may, for example, be deposited in the centre of the cereal product, which may have the shape of a round tartlet of the "Mino Rollo" type from Lu, a square "Milk Break" type biscuit from Lu or a "Barquette" type Genoese pastry from Lu. As in the previous case, a central deposit of filling is obtained, but it is more visible.
2.2—Alternatively, the cereal product may be "bottomed", i.e. coated on its lower face with a layer of filling, using a liquid dipping process followed by cooling intended to solidify the layer of filling.
2.3—Another possible application consists of completely coating the cereal product with a layer of filling. This uniform layer is obtained by passing the cereal product under a "curtain" of liquid filling which coats the top and sides of the product with a layer of filling, the lower face being coated by a "bottoming" as described in 2.2.
2.4—The uniform layer of filling may also be molded: the liquid filling is deposited in a mold then cooled to produce a solid shell which may then be combined with a cereal bar. This produces a product with an excellent surface (smooth) and enables the surface to be marked.

The filling formula given in application 1 is suitable for these applications. Another possible formula is given in Table 2 below. In this second example of a filling formulation, the yogurt powder is added directly to a commercial icing (Blanche, reference G-PR3040-105 from Barry-Callebaut).

TABLE 2

| Ingredient | % used in filling (% w/w) |
| --- | --- |
| Vegetable fat | 30% |
| Icing sugar | 40% |
| Yogurt powder of the invention | 30% |
| Total | 100% |

3. Application as a "décor" to surface or to bulk of product
The filling may be deposited in the form of filaments or stripes on the surface of the product. The depositing apparatus is very similar to case 2.3, with the exception that "sheeting" or "fishtail" deposition, generating a continuous curtain, is replaced by nozzles producing filaments of filling.

The various filling applications, more generally biscuits, confectionery, etc, of the powder of the invention have the following points in common:

- preferably, the powder is dispersed in an anhydrous medium the water content of which is very low (just the water added by the powders). The viability determinations of Example 13 below confirm that the survival rates of the ferments is comparable in a medium of this type to that observed for the initial powder.
- Preferably, filling is combined with the cereal product after baking. Raising the temperature to which the ferments are subjected does not exceed a temperature of the order of 35° C. or 40° C. for a period of the order of a maximum of a few hours. The good thermal stability of the powders of the invention was validated after more than two weeks (i.e. 340 h) at 35° C. The impact of the process for incorporating powder into the filling on the viability of the ferments is thus negligible.
- Preferably, the filling is combined with a cereal product with a low residual moisture content, such as dry biscuits, wafers or cereal flakes/particles. Exchange of water between the anhydrous filling and the cereal product is thus limited, which guarantees that the ferments will survive.
- Because the powder is rich in ferments, the final biscuit or confectionery product obtained has a "yogurt equivalent" (in terms of lactic flora) in the range 1 to 10:
- as an example, the finished product may contain 35% filling with 10% yogurt powder, i.e. 3.5% yogurt powder with $3 \times 10^9$ ferments, which represents 118 ferments/gram. For a finished product of 15 g, this represents $1.5 \times 10^9$ ferments, i.e. the equivalent of the quantity of ferments contained in a yogurt (=$1.25 \times 10^9$ ferments);
- as an example, the finished product may contain 67% of filling with 30% yogurt powder, i.e. $6 \times 10^8$ ferments. For a 22 g bar, the same calculation gives 10 "yogurt equivalents", i.e. 10 times the quantity of ferments contained in a conventional yogurt.

More particularly, the present application pertains to a biscuit which comprises at least one powder of the invention and/or at least one filling in accordance with the invention.

The term "biscuit" as used in the present application means baked cereal products comprising a dough obtained from a mixture comprising variable proportions of one or more cereal or leguminous flours or fractions of cereal or legumes, fat and one or more sugars, the latter however only being in negligible quantities or zero quantities for certain product varieties such as crackers or biscottes.

The powder of the invention may also be used in the manufacture of confectionery. Thus, the present application envisages confectionery which comprises at least a powder of the invention and/or at least a filling of the invention.

In the present application, all lactic bacteria contents which are given are the amounts of said lactic bacteria in a live or viable form.

In the present application, the term "comprising", which is synonymous with "including" or "containing", is an indefinite term and does not exclude the presence of one or more additional element(s), ingredient(s) or method step(s) which are not explicitly indicated, while the term "consisting" or "constituted" is a definite term which excludes the presence of any other additional element, step or ingredient which is not explicitly disclosed. The term "essentially consisting of" or "essentially constituted by" is a partially definite term which does not exclude the presence of one or more additional elements, ingredients or steps provided that the additional elements, ingredients or steps do not materially affect the properties forming the basis of the invention.

As a result, the term "comprising" (or "comprises (comprise)") includes the term "consisting", "constituted" as well as the terms "essentially consisting of" and "essentially constituted by".

In the present application, "CNCM" is the Collection Nationale de Cultures de micro-organismes [National collection of micro-organism cultures]; Institut Pasteur; 25 rue du Docteur Roux; F-75724 Paris, Cedex 15; France.

EXAMPLES

In the examples below, "ST" means *Streptococcus thermophilus*, and "LB" means *Lactobacillus bulgaricus*.

Example 1

Manufacture of a Yogurt Powder in Accordance with the Invention

1. Preparation of a Dairy Substrate for the Manufacture of Yogurt or Fermented Milk Mass with a High Cell Concentration A dairy substrate was prepared, fermentation of which allowed the desired yogurt or fermented milk mass to be produced.

As an example, to produce a yogurt, a dairy mixture (dairy substrate) can be prepared as follows:
incorporating skimmed milk powder into milk with 0% fat to obtain a dry extract of 20% (for example, for a skimmed milk with 8.8% dry extract, incorporate 12.8% of powder with a 96.2% dry extract);
allow the mix to rehydrate for 30 minutes at 4° C. with gentle stirring;
pasteurize the mix at 95° C. with a hold period of 10 minutes;
cool the mass to 38° C.

2. Production of Ferment Necessary for the Manufacture of Yogurt or Fermented Milk Mass with a High Bacterial Concentration:

To produce a product which can be designated a yogurt, it is necessary to select at least one strain of ST and at least one strain of LB as the lactic ferments.

Thus, preferably, at least one strain of ST and at least one strain of LB is selected which can propagate on dairy substrate so that they can produce a high density of one or more inoculation ferments, more particularly ferments wherein the ST or, if appropriate, LB population or a ferment in which each of the ST and LB populations is:
$3\times10^{10}$ cfu/g or more for *S. thermophilus*, $1\times10^9$ cfu/g or more for *L. bulgaricus* for ferments in the frozen form; or
$1\times10^{11}$ cfu/g or more for *S. thermophilus*, $4\times10^9$ cfu/g or more for *L. bulgaricus* for ferments in the freeze dried form.

To produce the yogurt or fermented milk mass which, in accordance with the invention, is intended to be powderized, a selection is made, from strains of lactic bacteria which are suitable for the manufacture of the desired yogurt or fermented milk, of those which preferably produce few or no exopolysaccharides (EPS).

A complementary or alternative selection criterion may thus consist of selecting at least one strain of ST and/or at least one strain of LB which produce (s) few or no exopolysaccharides (EPS). This low EPS production criterion is more particularly applicable to the case of ST strains.

Examples of appropriate strains of ST and LB include, for example:
for ST, the strain deposited with the CNCM with accession number I-2130;
for LB, the strain deposited with the CNCM with accession number I-1519.

If necessary and/or desired, the lactic bacteria strain(s) selected are revived by subculturing on a culture medium.

In the context of industrial production, the selected lactic strain or strains were preferably then packed in the form of freeze dried ferment or in the form of frozen ferment (for example using the protocol for producing frozen granules described below in Example 2).

To select a lactic ferment strain which produces few or no exopolysaccharides (EPS), a suitable methodology comprised measuring the viscosity of the fermented milk obtained by fermentation of a dairy substrate using the candidate strain(s), such as a yogurt produced using said candidate strain(s).

The method for measuring viscosity in the dairy industry allows a determination to be made of whether the strain(s) employed for fermentation of the milk provides a fermented milk with a ropy texture (high viscosity), or of the texturing type (medium viscosity) or whether it produces a fermented milk with a brittle texture (low viscosity).

The method for measuring a fermented milk comprises using a refrigerated viscosimeter provided with a system that can apply an increasing then decreasing shear gradient to the fermented milk, such as the Mettler RM® 260 refrigerated viscosimeter provided with a coaxial DIN 145 type system. This rotary system allows destructuring of the product to be observed as a function of a linear shear gradient, or a stress at a given gradient to be observed.

In brief, this method comprises:
inoculating the candidate lactic strain (or strains) at a temperature of 40° C. to a pH of 4.7 on an appropriate culture medium, such as a model fermented milk medium composed of 120 g of skimmed milk powder, 1 g of N3 peptide (Vitalarmor 950, Armor proteins) and permutated water to a qsp of 1 liter (if desired, several batches of fermented milk may be produced under identical conditions to provide several comparable examples) (conventional *S. thermophilus* inoculation doses may be used, for example inoculating at 1% v/v, as described in Example 6);
if the fermented milk model(s) obtained is (are) set product(s), this (these) fermented milk(s) is (are) preferably stirred manually using a spatula for 1 minute;
incubation at 4° C. for 30 minutes of said fermented medium(ia) or of at least one sample removed from the fermented medium(ia);
the viscosity measurements are carried out at 4° C. using a Mettler RM® 260 refrigerated viscosimeter provided with a coaxial DIN 145 type system.

The product was subjected to an increasing shear gradient of 0 to 20 s$^{-1}$ for 1 minute. This phase corresponded to the ramp-up. Next, it was subjected to a decreasing shear gradient of 20 to 0 s$^{-1}$ for 1 minute, corresponding to the ramp-down. The results are obtained in the form of a continuous flow curve with a ramp-up and a ramp-down between 0 and 20 s$^{-1}$.

FIG. 1 shows the three major types of flow curve:
the type of curve obtained using the *S. thermophilus* 001 010 strain which corresponds to a strain which produces a fermented milk with a ropy texture (high viscosity, top curve);
the type of curve obtained using the *S. thermophilus* 001 098 strain which corresponds to a strain which is of the texturing type (medium viscosity, middle curve);
the type of curve obtained using the *S. thermophilus* TS 10B strain (DSM Food Specialities Dairy Ingredients; BP 1; 2600 MA Delft; Netherlands) which corresponds to a strain which produces a fermented milk with a brittle texture (low viscosity).

The measurements obtained are adjusted by applying Casson's mathematical model to obtain the Casson viscosity.

The Casson model is formulated by the following equation (equation 1):

$$\sqrt{\tau} = \sqrt{\tau_0} + \sqrt{\eta \times D} \quad (1)$$

τ=stress (Pa);
$\tau_0$=flow threshold of product (Pa);
η=viscosity of product (mPa·s)
D=shear gradient (s$^{-1}$).

This model is tracked by tracing the linear regression line over the descending portion of the curve; it reveals two important parameters:
the flow threshold of the product, $\tau_0$, corresponding to the origin of the ordinate;
the viscosity η of the product, corresponding to the slope of the regression line.

FIG. 2 shows the determination of the flow threshold $\tau_0$ and the viscosity η of a fermented milk using strain 001 098 on the descending flow curve modelled by Casson.

3. Manufacture of Yogurt Mass with a High Bacterial Concentration:

Yogurt or fermented milk mass was manufactured by inoculation of the substrate produced in 1 using the lactic bacteria strains selected in 2, and resulted in lactic fermentation.

As an example, to produce a yogurt mass:
culture the mix produced in 1 with 20 g/l of concentrated ferments prepared in 2 using the following composition: 95% of frozen concentrates with a ST population of at least 3×10$^{10}$ cfu/g, plus 5% of LB concentrate of at least 1×10$^9$ cfu/g;
ferment at 38° C. for 3 h to 4 h to stop fermentation at a pH of 4.8+0.5/−0.3 pH units (for a yogurt), for example a pH of 4.8+0.4/−0.3, for example pH=4.8+/−0.3 pH units, for example pH 4.8+/−0.2 pH units, preferably pH+0.51-0.1 (for a fermented milk, pH=4.6+/−0.2, generally);
stop fermentation by cooling and smoothing on a SR10 type platform;
storage of mass at 4° C. to the maximum 10 days.

4. Manufacture of Fermented Milk or Yogurt:

The yogurt or fermented milk obtained at the end of point 3 above was dried under mild conditions in order:
to reach an Aw (measured at ambient temperature, i.e. at a temperature in the range approximately 20° C. to 26° C., for example about 25° C.) of 0.3 or less, preferably 0.25 or less, highly preferably less than 0.25, advantageously 0.2 or less. Preferably, said Aw is 0.05 or more, preferably 0.09 or more. In a preferred implementation of the invention, said Aw is 0.05-0.25, preferably 0.05-0.20, highly preferably 0.09-0.19, for example 0.10-0.19;
while maintaining a maximum number of live or viable ST and LB cells (i.e. limit the loss of live or viable cells as far as possible).

The Aw (water activity) measurements were carried out in the normal manner used by the skilled person for food products. The Aw may, for example, be measured using a dew point hygrometer such as a hygrometer from Aqualab® sold by DECAGON DEVICES, Pullman, Wash., USA.

A sample of a few grams of powder (or, if appropriate, filling comprising a powder of the invention) is introduced into a measuring cup. The cup is then positioned in a thermostatted measuring chamber. The humidity of the air above the powder (or, if appropriate, the filling) is analyzed in a few minutes then automatically compared with the humidity above pure water at the measurement temperature. The ratio of the two relative humidities, designated the water activity (Aw) is then displayed by the apparatus after the few minutes necessary for equilibration of the chamber.

Examples of appropriate mild drying processes include drying by freeze drying, fluidized bed treatment and drying by gentle (mild) atomization, for example atomization with an outlet temperature of 100° C. or less, preferably 80° C. or less, more preferably 60° C. or less.

An example of a mild atomization drying process is described in Example 3 below.

The drying process used must not add products to the powder that cannot be used in human foodstuffs and/or which cannot be used and retain the designation "yogurt". The list of such undesirable products may vary depending on the legislation in the countries concerned. For a powder intended for consumption in France or in Spain with the designation "yogurt", maltodextrins must not be added to the powder produced in the process.

A powder in accordance with the invention is obtained, which powder has a very high concentration of live or viable lactic bacteria, and more particularly in the case of the yogurt mass described, a very high concentration of live or viable ST and LB, which is not contaminated by germs which are undesirable in human foodstuffs. The powder produced in accordance with the invention from a yogurt mass then itself can be designated a yogurt.

The powder obtained has an exceptional capacity of being capable of being stored for several months at ambient temperature without significant loss of live or viable lactic bacteria or at least without significant loss of live or viable ST and LB.

More particularly, the powder of the invention has an exceptional capacity of being capable of being stored for several months at ambient temperature (about 20° C.) without the concentration of live or viable LB and/or ST dropping below the minimum ST+LB concentration threshold which is required in order to be designated a yogurt, namely without the population of live or viable ST+LB descending below $10 \times 10^7$ cfu/g.

At 35° C., a slow and gradual reduction in lactic flora with time is observed: after 2 weeks at this temperature, the survival rates were in the range 25% to 60% for *S. thermophilus*, i.e. at the end of storage between $1.5 \times 10^8$ cfu/g and $1.5 \times 10^9$ cfu/g was observed, which is still high. The survival rate was lower for *L. bulgaricus*, of the order of 2% to 5%, hence the concentrations of between $2 \times 10^2$ cfu/g and $2 \times 10^3$ cfu/g. The mortality rate at 35° C. of the total flora in the powders of the invention was also generally equivalent to those of prior art powders at 5° C. or 20° C., which are storage conditions which are considered by the skilled person to be ideal.

The powder produced has a granulometry which is appropriate to its destination (reconstitution of yogurt which can be designated a yogurt, use as an ingredient for the manufacture of a food filling, or more generally as an ingredient for the manufacture of a food product). As an example, it may have a granulometry of 10 to 500 micrometers, preferably 10 to 300 micrometers.

Example 2

Manufacture of Frozen Concentrates with a High Density of Lactic Ferment (ST and/or LB Each at Least $5 \times 10^{10}$ cfu/g)

1. Preparation of Inoculum:
select at least one strain of LB and/or at least one strain of ST which produces little or no EPS, for example the CNCM I-2130 strain of ST and/or the I-1519 strain of LB;
revive the selected strain(s) by three successive subcultures on a culture medium adapted for lactic bacteria, such as milk plus yeast extract (skimmed milk powder of 90 to 140 g plus powdered yeast extract, 0.5 to 3 g, qsp to 1 kg with distilled water, sterilization 121° C. for 15 minutes):
inoculating at 1%, incubation at 40° C. for the ST strain or strains, at 44° C. for the LB strain(s);
stopping subculture by cooling (4° C.) after setting (milk gelling);
inoculating using the last subculture (1%), 200 ml of M17 (stock sold by Biokar Diagnostics, reference BK 0888HA) at 40° C. (for ST), 200 ml of MRS (stock sold by Serlabo, reference BD-288130 (0881-17)) at 44° C. (for LB);
monitoring the optical density at 660 nanometers using a spectrophotometer;
stopping bacterial growth of the inoculum by refrigerating (4° C.) after attaining the end of the exponential growth phase (about 4 h to 4 h30 under good conditions).

2. Preparation of Fermenter (Example: Type BIOSTAT ED):
Choice of normality of regulation base:
ST: 6N NaOH solution;
LB: 2N NaOH solution.
Autoclave sterilization, 121° C., 15 minutes:
base admission and inoculation system;
base solution;
rotor and bottom of centrifuge;
connections from fermenter to centrifuge;
connections to recover the sterile supernatant to a flask;
connection of bottle of sterile concentrate with nitrogen (tube+needle).
Calibration of pH Probe:
Sterilization of Fermenter:
fill with ultrapure water;
program an in situ sterilization cycle (121° C., 20 minutes).

3. Preparation of Culture Medium:
use distilled water;
weigh the various compounds of the medium (see ingredients below);
hydration for 30 minutes with stirring;
autoclave sterilization (121° C., 15 minutes);
chill to 4° C.: 40° C. (ST), 44° C. (LB);
aseptic transfer of culture medium to fermenter.

| ST propagation medium | LB propagation medium |
|---|---|
| Distilled water | Distilled water |
| Ultrafiltration permeate 50 g/l | Ultrafiltration permeate 50 g/l |
| Yeast extract 10 g/l | Yeast extract 15 g/l |
| Manganese sulphate 0.1 g/l | Manganese sulphate 0.1 g/l |
| Skimmed milk powder 10 g/l | Tween 80 |
| Starting pH 6.5 | Starting pH 6.5 |

4. Propagation Initiation:
seed fermenter with inoculum in an amount of 100 ml per 6 liters;
initiation of fermenter programme to adjust the temperature, adjust the pH via sodium hydroxide solutions, stir the culture medium; record the pH, the temperature and the sodium hydroxide delivered volume.

5. Stopping Propagation:
The data regarding the volume of sodium hydroxide delivered during the fermentation to regulate the pH were processed to obtain a cumulative curve of the volume of sodium hydroxide consumed as a function of time, then to obtain a curve of the rate of consumption of sodium hydroxide as a function of time. The maximum point on this latter curve corresponded to the moment when propagation had to be stopped by cooling the fermentate.

6. Cold Centrifuging (Example: 8575Continuous Flow Rotor):
removal of fermentate by peristaltic pump, and supply to base of centrifuge;
speed: 13000 rpm (ST), 10000 rpm (LB);
recovery of part of the supernatant in a sterile flask;
after centrifuging, diluting the residue obtained with the supernatant until it can be pipetted, transfer into a sterile bottle which has been chilled (working under a laminar flow hood, keeping the concentrate at temperatures below 10° C.).

7. Freezing (Operation in Laminar Flow Hood, Aseptic Manipulation Keeping the Concentrate at Temperatures Below 10° C.):
connecting the diluted residue bottle to a peristaltic pump using a thin flexible tube the other end of which is connected to a system allowing connection with several syringe needles;
provided an isothermal tank filled with liquid nitrogen below the needles starting the peristaltic pump and adjusting the flow rate to obtain a regular droplet rate for the concentrate into the liquid nitrogen;

recovering and packaging the granules in a sterile manner then storing them at −80° C.

7. Check of Frozen Concentrated Granules:

After rapidly melting the granules, enumeration (ST or LB: FIL117A: 1988 method) was carried out.

A frozen granule of *S. thermophilus* and/or *L. bulgaricus* had a population of $3 \times 10^{10}$ or more cfu/g for ST, $1 \times 10^9$ cfu/g for LB respectively.

Example 3

Example of an Extensive but Mild Drying Process

FIG. 3 shows a diagram of a mild atomisation device adapted to the manufacture of a powder in accordance with the invention.

A high pressure pump 1 brings the concentrate to the atomization nozzles. Because of its small diameter, these cause powderizing of the product into a cloud of fine droplets. Hot air (the temperature of which is preferably in the range 190° C. to 210° C.) is also supplied to the top of the drying chamber 2. As the product and air descend as a co-current in the chamber the principal transfer of water takes place from the product to the air. For these air temperatures, the temperature of the product preferably does not exceed 80° C. during drying. Because of the symmetry of the drying chamber, the air rises along the walls, entraining with it the small diameter particles of product, designated fines. The air, which is thus charged with water and fines, is extracted from the top of the chamber (its temperature is thus in the range 80° C. to 90° C.) then passes through a series of cyclones 3, which because of their geometry, separate the air from the fines. The air, free of fines, is extracted and discharged outside via a ventilator. A final filter usually guarantees final purification of the air to limit the discharge of organic material to the environment as much as possible.

The fines are recovered and re-incorporated into the product 4, either at the drying chamber or at the top of the chamber, or at the level of the external vibrating bed. The choice of the re-injection level will be dictated by the granulometry desired by the producer.

At the bottom of the drying chamber, the granules meet air 5 at a medium temperature (between 60° C. and 80° C.) which carries out two function: constituting a fluidized bed and continuing drying. The granules, at the temperature of the air in the fluidized bed, are extracted from the chamber and passed into an external vibrating bed 6, which finishes the drying and cooling of the powder (to a temperature of about 30° C.) before packaging it.

In general, a sieve 7 is placed at the outlet from the vibrating bed to separate the small blocks formed during drying. The product may then be stored or packaged in the mill.

Example 4

Comparison of the Fermentation Kinetics Obtained by Bulk Inoculation of the Invention with that Obtained with Lower Inoculation Doses A dairy mix was inoculated with a strain of ST (CNCM I-2130 strain) and a strain of LB (CNCM I-1519) of the invention, as described in point 1 of Example 1.

The strain of ST and that of LB were inoculated in the form of frozen granules prepared as described in Example 2 above.

Each frozen granule contained at least $3 \times 10^{10}$ cfu/g of ST, and/or at least $1 \times 10^9$ cfu/g of LB. The frozen granules of ST and LB were supplied to the dairy mix to provide $2.7 \times 10^9$ cfu/g of ST and $1.4 \times 10^7$ cfu/g of LB.

These inoculation doses were 10 to 1000 times higher than those conventionally used during traditional manufacture of a yogurt or fermented milk (0.01 g/l to 1 g/l).

At the same time, yogurts were produced under the same conditions, but using inoculation doses of ST and LB which were lower than those recommended by the invention (see Example 4 and FIG. 4), namely an inoculation dose of ST of $1 \times 10^7$ cfu/g and an inoculation dose of LB of $5 \times 10^4$ cfu/g. Fermentation of this inoculated dairy substrate at doses lower than those of the invention was carried out until a yogurt was obtained with live ST and LB concentrations of $5 \times 10^8$ cfu/g for ST and $5 \times 10^6$ cfu/g for LB. Such ST and LB contents correspond to the upper limit of that which can be obtained using the prior art approach.

These yogurts are designated the "reference yogurts" herein.

The pH was measured with time.

Figure 4:
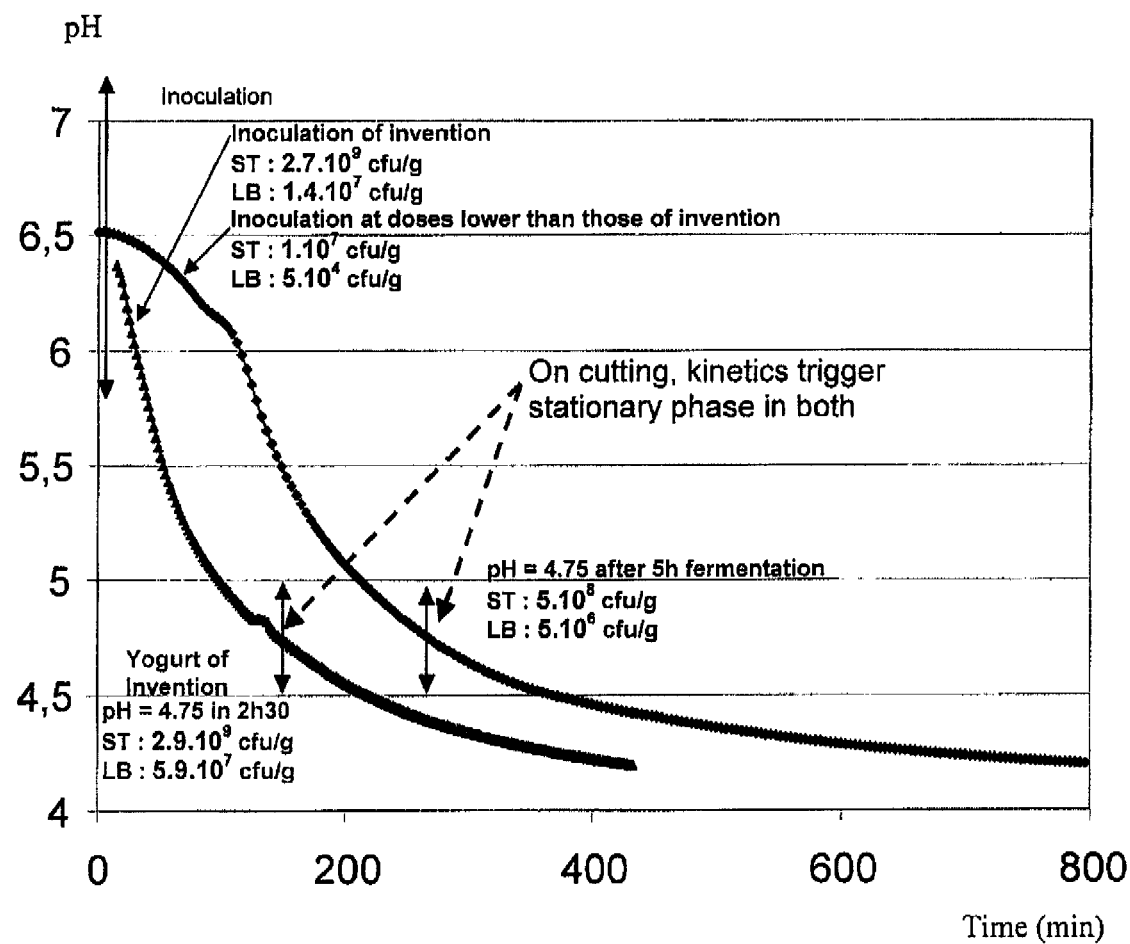
FIG. 4 shows the kinetics for two acidifications.

FIG. 4 shows the acidification kinetics obtained (lower curve: inoculation in accordance with the invention, producing a yogurt of the invention; top curve: inoculation at doses lower than those recommended by the invention).

Using the inoculation doses of the invention, milk acidification occurred over a shorter period than that observed with the lower inoculation doses, but the acidification kinetics of the invention corresponded to the traditional kinetics of manufacture of yogurts or fermented milks (kinetics of ST+LB symbiosis).

In the context of the invention, the growth of lactic ferments was lower than that which could be observed in the context of a traditional yogurt or fermented milk manufacturing process, but the final population of lactic ferments was much higher.

The population inoculated in the context of the invention was even higher than the population which can be obtained at the end of fermentation during the production of a yogurt or fermented milk obtained from inoculation doses of ST and LB lower than that recommended by the invention.

In the context of the invention, it was observed that at the start of fermentation, the latency phase was considerably reduced compared with fermentation obtained with lower inoculation doses, but the two acidification kinetics graphs coincided at the end of fermentation (vertical arrows at pH 4.75=moment when fermentation is stopped by cooling).

At the end of fermentation, the two biomasses both appeared to be in the stationary growth phase, during which phase the production of secondary metabolites occurs (see Example 10).

Example 5

Example of Preparation of Samples for Microbiological Enumeration (% of Live or Viable ST and LB)

The powder of the invention, or if appropriate the filling of the invention, could be prepared as follows, in order to carry out the method for enumerating the lactic strains present.

This method was developed to optimize the technique for rehydrating yogurt powders to enumerate the lactic bacteria present.

It is also possible to use this method for application to fatty fillings.

Principle

Rehydration of a yogurt powder in the form of granules or fine powder by encouraging homogenization, the contact time with the diluent, the incubation temperature, must be optimized to rehydrate the powder without changing the initial population of the lactic ferment contained in the yogurt powder.

Reagents

Diluent

Tryptone salt was used to carry out the dilutions

Equipment

Stomacher® bag with closure clips;
weighing crucible;
0.01 g precision balance;
sterile spoon;
Stomacher® or homogenizer;
thermostatted and stirred bath;
1 ml sterile pipette.

Operation

Weighing Sample

Use a sterile Stomacher® bag on a weighing crucible and a 0.01 g precision balance.

Weigh about 5 grams of powder, noting exact quantity.

Add 45 grams of tryptone salt diluent, noting exact quantity.

Close Stomacher bag with clips.

Preliminary Homogenisation

Homogenise the Stomacher bag for 10 seconds.

This step can suspend the powder in the diluent.

Incubation

Place the bags in a stirred bath heated to 37° C. for exactly 30 minutes.

This step allows the powder to be gently heated and dissolve naturally in the liquid.

Homogenization

Homogenize the Stomacher® bag again for 2 minutes.

This step can break the last particles remaining in suspension and mix the dilution.

Next, produce a decimal dilution of the sample.

Enumerating Lactic Bacteria in the Rehydrated Yogurt Powder

Apply the official standard for enumerating lactic bacteria: FIL 117B: 1997. yogurt: Enumeration of characteristic micro-organisms. A colony-count technique at 37° C.

Expression of Results

Refer to standard FIL 117B: 1997 (paragraph 9) for expression of the result.

Take the initial dilution of the sample in the Stomacher® bag into account.

Example 6

Preparation of Medium for Measuring Viscosity (Selecting Brittle Type Strains)

Manufacture of fermented milks to measure viscosities:
1. Preparation of dairy mix:
120 g of skimmed milk powder;
1 g of N3 peptide (Vitalarmor 950, Armor proteins) for 1 liter of mix
930 ml of permutated water.

Leave the mix for 30 minutes at ambient temperature, the time for the milk powder to rehydrate.

Distribute the mixture in one liter in bottles then incubate them in the thermostatted bath once the water is boiling. Leave for 35 minutes, the time for the centre of the bottles to reach 95° C.

Adjust the temperature to 95° C. and leave for 10 minutes, the time corresponding to pasteurization of the milk.

Cool the bottles by leaving them in cold water for 30 minutes, then leave them overnight at 4° C.

2. Preparation of Inoculum

Subculture the TS 10B strain (DSM Food specialities Dairy Ingredients; BP 1; 2600 MA Delft; Netherlands) at least twice in sterilized milk plus yeast extract:
  subculture medium: 135 g of skimmed milk powder+2 g of yeast extract (Biospringer code 180)+930 ml of permutated water, autoclaving 115° C., 20 minutes;
  1% inoculating;
  fermentation at 44° C. for 3 hours.

3. Fermentation incubate the 4×1 liter bottles of mix at 43° C. for 45 minutes.
inoculating:
  distribute the 4 liters of mix into 2×2 liter bottles+0.02 ml of formate/l of mix;
  culture the 2 l of mix at 1% (v/v) with ferment (see Example 2 for the preparation of the concentrated ferments);
  homogenize well;
  place in pots: 16 pots per product and place in an oven at 40° C. for fermentation;
  stop fermentation at a pH of 4.70 (possibility of using 3 pots) by leaving them overnight at 4° C.;
  the pots of fermented milk are stored at 10° C. for one week;
  the texture measurements are carried out on day 8.

Example 7

A Powder in Accordance with the Invention has a Lactic Bacteria Survival Rate after Passage Through a Human Stomach Type Environment which is Equivalent to or Better than that of a Yogurt A powder in accordance with the invention was produced as described in Example 1 (inoculation using frozen concentrates produced as described in Example 2; drying process of Example 3). This powder contained $5 \times 10^9$ cfu/g of ST CNCM I-2130 and $1 \times 10^6$ cfu/g of LB CNCM I-1519 in the live form.

This powder of the invention had also been formulated into the form of a fatty filling (composition of filling as described in Table 1-see descriptive section).

This powder of the invention was tested alone and in the form of fatty filling.

Another powder of the invention was produced as described in Example 8 (dairy substrate with a high DM content as described in Example 8—DM content of 30%; inoculation using frozen concentrates as described in Example 2; drying process of Example 9). This other powder of the invention was formulated into a fatty filling (composition of filling as described in Table 1-see descriptive section).

This other powder of the invention was tested in the form of the fatty filling alone.

At the same time, yogurts were produced under the same conditions as yogurts which were manufactured to produce the powder 1, but using inoculation doses of ST and LB which were lower than those recommended by the invention (see Example 4 and FIG. 4), namely an inoculation dose of ST of $1 \times 10^7$ cfu/g and a LB inoculation dose of $5 \times 10^4$ cfu/g.

Fermentation of this dairy substrate inoculated at doses lower than those of the invention was carried out to obtain a yogurt which had live ST and LB concentrations of $5 \times 10^8$ cfu/g for ST and $5 \times 10^6$ cfu/g for LB. Such ST and LB contents corresponded to the upper limit which could be obtained by the prior art approach.

These yogurts were denoted "reference yogurts".

These powders and fillings were subjected to a test which simulated passage of the powder through the human stomach and the survival rate of the lactic bacteria ST and LB was measured using the TNO model (Netherlands Organization for Applied Scientific Research; Utrechtsweg 48; 3704 HE Zeist; PO Box 360; 3700 AJ Zeist; Netherlands), Gastro-intestinal T.I.M (International patent application WO-A-94/09895 and US equivalents such as U.S. Pat. No. 5,525,305).

The results are shown in FIGS. 9 and 10 (cumulative survival rates as a percentage of the initial dose after passage through the stomach and the small intestine, for ST, FIG. 9 and LB, FIG. 10).

The survival rates for the gastro-intestinal model show that the yogurt powder of the invention has higher survival rates than those observed in the reference yogurt for the two *S. thermophilus* and *L. bulgaricus* species. These results show that the powder yogurt of the invention is a high performance matrix for supplying viable yogurt bacteria to the large intestine.

The higher the survival rates, the better the alicament qualities.

It should be noted that if the powder of the invention is incorporated into a fat, such as a fatty filling, the survival rate will be still higher.

Example 8

Production of Yogurt or Fermented Milk in Accordance with the Invention, with a High ST and LB Concentration and which Also has a High DM Content A yogurt or fermented milk of the invention comprises a high density of ST and LB in a live or viable form (ST and LB contents in the live form as described in the application, for example a live ST concentration of $5 \times 10^8$ cfu/g or more and a live LB concentration of $1 \times 10^7$ cfu/g).

In a particular implementation of the invention, the yogurt or fermented milk produced also has a high dry matter content. In accordance with the invention, said yogurt or fermented milk may be produced from a dairy substrate with a high DM content (the conventional DM content of a conventional dairy substrate is of the order of approximately 10-20%, generally 11-13%). The high DM content of the dairy substrate may be obtained by concentration of this DM content, for example by eliminating part of the water contained in this dairy substrate.

For this particular implementation, target values for high DM contents are at least 25%, for example 25-60%.

A particular example of an implementation is as follows:

Fresh cow's milk was pasteurized, homogenized (140/20 bars), cooled and transferred to a storage tank where it was stored until used (storage time=24 hours). The stored milk contained 39.5 g/l of fats; 35.23 g/l of proteins; 129.5 g/l of dry matter (DM content 12-13%). Its density at 20° C. was 1.0299.

By re-circulation, demineralized lactoserum powder (pH about 6.5) from which the lactose had not been eliminated (commercially available 90% demineralised lactoserum powder, for example from LSF) was incorporated into a volume of hot osmosed water, preferably at a temperature in the range 50° C. to 60° C., for example 55° C. (0.295 kg of demineralized lactoserum powder per 1 l of osmosed water at 55° C.).

The re-constituted lactoserum then underwent a treatment at least equivalent to pasteurization (for example a temperature of 75° C. for 15 seconds), then was cooled, for example to 3° C. The lactoserum was intended for incorporation into milk.

The lactoserum was incorporated into milk to form a mixture of 69% milk and 31% reconstituted lactoserum. Pasteurized osmosed water was then added to obtain a mixture of 42% of milk, 19% of reconstituted lactoserum and 38% of pasteurized osmosed water.

The resulting solution constituted the starting dairy "mix" (=dairy substrate).

This mix underwent a heat treatment at least equivalent to pasteurization (for example a temperature of 75° C. for 15 seconds), homogenized, cooled (for example to 3° C.), and stored cold in a storage tank. The stored mix had a fat content of 16.5 g/l, a protein content of 2.3 g/l and a DM content of 110.81 g/l (DM content 11-12%). Its density at 20° C. was 1.0308.

The mix was then intended to be injected into evaporators to concentrate its DM content. Before being injected into the evaporators, for safety, the dairy mix which had been stored in a storage tank underwent another heat treatment at least equivalent to pasteurization (for example 90° C. for 20 seconds). The temperature applied to the dairy mix in the evaporators was about 85° C. at the inlet and about 55° C. at the outlet.

The DM content of the dairy mix was monitored at the evaporator outlet either by direct measurement (measurement of residual material after 17 hours at 105° C.) or by indirect measurement by continuously measuring the density of the mix leaving the evaporators (the DM content being deduced from pre-established charts giving the correspondence between density and DM content).

While the measured DM content did not correspond to a desired target DM content (for example a DM content of at least 36%, for example 36-48%), the dairy mix could be recycled to the storage tank and injected again into the evaporators.

In the example described here (milk supplemented with reconstituted lactoserum), one hour of circulation and recirculation in the evaporators was necessary for the dairy mix to reach, by evaporation, a DM content which corresponded to the desired target of 36-48%.

When the target DM value had been reached, the concentrated dairy mix was fed out of the evaporators. It was then intended to be inoculated with ST and LB in accordance with the invention, i.e. with high ST and LB concentrations, for lactic fermentation. For safety, the concentrated dairy mix was pasteurized again before inoculation (for example, 75° C. for 15 seconds). The concentrated and pasteurized dairy mix was cooled to a temperature close to the fermentation temperature. If inoculation of ST and LB was carried out using frozen concentrates, the concentrated pasteurized dairy mix was cooled to a temperature slightly above the fermentation temperature (for example about 47° C.) to accommodate the drop in temperature caused by subsequent inoculation of frozen concentrates.

In the example described here, the concentrated dairy mix was cooled to a temperature of about 47° C.; it had a fat content of 6.0 g/100 g, a protein content of 7.5 g/100 g, a DM content of 37.5 g/100 g (DM content 37.5%); its density at 47° C. was 1.117.

Inoculation of the dairy mix was carried out to an amount of 20 g/l with ST ferments (granules of frozen concentrate of *Streptococcus thermophilus*, CNCM I-2130, containing about $3.2 \times 10^{11}$ cfu of ST per gram of frozen concentrate, prepared as described in Example 2) and LB ferments (granules of frozen concentrate of *Lactobacillus bulgaricus* CNCM I-1519, containing about $7.9 \times 10^9$ cfu of LB per gram of frozen concentrate, prepared as described in Example 2).

Inoculation and lactic fermentation were carried out using standard methods in accordance with the Codex Stan A-11 (a)-1975 standard (now the Codex Stan 243-2003) and French Law n° 88-1203, to produce yogurts. Lactic fermentation was carried out at a temperature of 38° C., and was stopped when a pH of 4.8+0.5/−0.3 was reached (for a yogurt), for example a pH of 4.8+0.4/−0.3, for example a pH of 4.8+/−0.3 pH units, for example a pH of 4.8+/−0.2 pH units (for a fermented milk, pH generally =4.6+/−0.2).

The fermented product obtained was thus a yogurt or fermented milk:
which contains large amounts of ST+LB in the live form; and
which also had a high DM content, in particular a DM content of 36-48% (about 37%).

The fact that a dairy substrate with a high DM content as described here was used means that compared with a conventional dairy substrate, it has the advantage of being easier to control and more particularly, it is easier to limit the drop in pH during fermentation. The dairy substrate with a high DM content has a stronger buffering power than a dairy substrate with a conventional DM content.

It is thus easy to produce yogurts and fermented milks with low acidity (for example a pH of about 5.0-5.2), which corresponds to consumer's current tastes, with high ST and LB concentrations.

Compared with yogurts and fermented milks with a conventional DM content, the yogurts or fermented milks with a high DM content enjoy the advantage of being easier to transform into a powder, in particular by drying (atomisation, for example). The transformation process is simpler to carry out, and is cheaper.

During transformation into the powder form, yogurts or fermented milks with a high DM content can also limit problems regarding fines.

Example 9

Other Examples of Mild and Very Mild Drying, in Accordance with the Invention

In accordance with the invention, powderizing of the fermented milk or yogurt is preferably carried out under mild conditions to preserve as much of the ST and LB bacteria as possible in a live or viable form.

A mild drying device in accordance with the invention may, for example, comprise a drying tower connected to at least one cyclone. Said device generally follows the scheme of FIG. 3 and the description given in Example 3.

The product to be dried is supplied to the top of the tower, to the atomisation nozzles. Hot air is also supplied to the top of the tower. The product and hot air fall as a co-current into the chamber of the tower, resulting in a transfer of water from the product to the air.

The air, charged with water, rises up the walls of the chamber, entraining with it particles of product with very small diameters, designated fines. The air which is thus charged with water and fines is extracted from the top of the tower and directed towards the series of cyclones which separate the air from the fines. The fines-free air is extracted from the cyclones and discharged to the outside. The fines are recovered and re-incorporated into the product at the drying chamber.

At the bottom of the tower, the granules formed meet air at a medium temperature which constitutes a fluidized bed and continues the drying process. The granules are then extracted from the tower and routed onto a vibrating bed onto which air is blown (temperature close to ambient temperature).

In this type of apparatus, air is supplied at least two locations, namely the inlet to the tower (high temperature) and the bottom of the tower (medium temperature). If the apparatus is associated with an external vibrating bed, the air may be supplied at this third site (temperature less than or equal to the temperature at the bottom of the tower, preferably close to ambient temperature).

The air supplied to the inlet of the tower must be at a temperature sufficient to allow a transfer of water from the product to the air. This air is thus at a high temperature, generally a temperature of 21° C. or less, for example of the order of 190-210° C. The air temperature at the bottom of the tower is advantageously lower than the air temperature at the tower inlet, to result in gradual cooling of the granules being formed. This type of drying tower may also be associated with an external vibrating bed, to collect the granules formed. Air may be blown onto this vibrating external bed; this air can finish the drying and is at a temperature which is lower than or equal to the temperature of the air at the bottom of the tower. The air blown into the external vibrating bed is preferably at a temperature close to ambient temperature. In this manner, the granules formed in contact with the high temperature air inside the tower are slowly brought, via the bottom of the tower and the external vibrating bed, to a temperature close to ambient temperature.

In accordance with one implementation of the invention, the air temperature at the inlet to the tower is of the order of 160-190° C., advantageously of the order of 170° C.

In one implementation of the invention, the air temperature at the bottom of the tower is advantageously 80° C. or less, preferably a temperature of 60-80° C., highly preferably of the order of 70° C.

In one implementation of the invention, the air temperature in said external vibrating bed with which the drying tower may be associated is at a temperature of 25-40° C., preferably of the order of 30° C.

One particular implementation of the invention enables very mild drying.

In this particular implementation of the invention, the air temperature at the tower inlet is of the order of 160-190° C., advantageously of the order of 170° C., and the air temperature at the tower bottom is of the order of 60-80° C., advantageously of the order of 70° C. Advantageously, the air temperature at the tower inlet is of the order of 170° C. and the air temperature at the tower bottom is of the order of 70° C.

Preferably, in accordance with this particular implementation of the invention, the drying tower (more particularly, the atomisation tower) is associated with an external vibrating bed into which air is blown at a temperature which is lower than or equal to the air temperature in the tower bottom. Highly preferably, the air blown into the vibrating external bed is at 25-40° C., more preferably of the order of 30° C.

In accordance with the invention, the combination of:
an air temperature at the tower inlet of the order of 160-190° C., advantageously of the order of 170° C.;
an air temperature at the tower outlet of the order of 60-80° C., advantageously of the order of 70° C.; and
an external vibrating bed with blown air at about 25-40° C., advantageously of the order of 30° C.;
results in a triple drying effect which is highly effective (the powder granules obtained had a DM content of about 97%) which above all is very mild.

These mild and very mild drying methods of the invention may be employed for any yogurt or fermented milk of the invention, and more particularly on yogurts and fermented milks with high DM contents of the invention (such as those illustrated in Example 8).

Granules of powder of yogurt or of fermented milk are then obtained, in accordance with the invention. These granules of powders contain high concentrations of ST and LB in a live or viable form (as described in the present application, for example a ST concentration of $5 \times 10^8$ cfu/g and a LB concentration of $1 \times 10^4$ cfu/g), and can be designated a yogurt or fermented milk. Preferably, these powder granules have an Aw of 0.3 or less, preferably 0.2 or less.

These yogurt powder granules have the advantage of being capable of being stored at a temperature of 20° C. for at least four months, without any reduction in the populations of live or viable S. thermophilus and L. bulgaricus being observed. In fact, in such granules, the amount of live or viable S. thermophilus and L. bulgaricus (total content) does not drop below $5 \times 10^8$ cu/g after 6 months storage at 20° C.

Example 10

A Powder of the Invention has Equivalent or Better Metabolite Characteristics than Those of a Reference Yogurt Obtained from Inoculation Doses of ST and LB which are Lower than Those Recommended by the Invention Two powders in accordance with the invention were produced as described in Example 1 (inoculation using frozen concentrates produced as described in Example 2; drying process of Example 3).

Powder 1 (produced as described in Example 1—conventional DM content) comprised $8 \times 10^9$ cfu of ST (CNCM I-2130) and LB (CNCM I-1518) bacteria in the live form per gram of powder, and powder 2 (produced as described in Example 8—high DM content) containing $2.6 \times 10^9$ cfu/g.

At the same time, yogurts were produced under the same conditions as the yogurts manufactured to produce powder 1, but using inoculation doses of ST and LB which were lower than those recommended by the invention (see Example 4 and FIG. 4), namely an inoculation dose of ST of $1 \times 10^7$ cfu/g and an inoculation dose of LB of $5 \times 10^4$ cfu/g.

Fermentation of this dairy substrate inoculated in doses lower than those of the invention was carried out to obtain a yogurt with ST and LB contents in the live form of $5 \times 10^8$ cfu/g for ST and $5 \times 10^6$ cfu/g for LB. Such ST and LB contents correspond to the upper limit which could be obtained using the prior art approach.

These yogurts are designated "reference yogurts" herein.

The metabolic characteristics of the powders of the invention were measured and compared with those of the reference yogurts:

Beta-Galactosidase Activity:

The beta-galactosidase activity was measured using an enzymatic test (T=37° C., pH=7.3; $A_{401nm}$; optical path=1 cm; continuous spectrophotometric determination), as described in Craven, Steers and Anfinsen (Journal of Biological Chemistry, 1965, 240, 2468-2477), or on Sigma-Chimie's site (http://www.sigmaaldrich.com/sigma/enzyme%20assay/g2513enz.pdf).

The following results were obtained:

TABLE 3

| beta-galactosidase activity | Reference yogurt (D + 7) | Powder 1 of invention | Powder 2 of invention |
|---|---|---|---|
| Mean total activity/g | 7.5 | 66.1 | 40.2 |
| Constant dry extract: mean total activity/g | 52.5 | 66.1 | 40.2 |

Proteolysis:

The nitrogen content measurements were carried out:

for protides, by measuring the total quantity of nitrogen and multiplying this total content by 6.38 (Kjeldahl's method, NF EN ISO 8968-1 standard, May 2002, classification number V04-221-1);

for non-protein nitrogen (i.e. amino acids), by measuring the NPN (Kjeldahl's method, NF EN ISO 8968-4 standard, May 2002, classification number V04-221-4);

for non caseic nitrogen, by following the protocol described in Kjeldahl's method, NF EN ISO 8968-2 standard, May 2002, classification number V04-221-2).

NF standards (French standards) are available from AFNOR (Association Française de Normalisation [French Standards Association]; 11, rue Francis de Pressensé, 93571 La Plaine Saint-Denis Cedex, France).

In addition to the two powders of the invention and the reference yogurt, the proteolysis measurements were carried out on the initial milk before inoculation (dairy mix as described in Example 1).

The results were as follows:

TABLE 4

| | Milk | Reference yogurt (D + 7) | Powder 1 of invention | Powder 2 of invention |
|---|---|---|---|---|
| Protides (N*6.38) | 3.45 g/l | 3.79 g/100 g | 36.55 g/100 g | 35.92 g/100 g |
| Non-protein nitrogen over total nitrogen | 2.5% (1) | 7.9% | 4.7% | 6.9% |
| Non-caseic nitrogen (ANC*6.38) | 20% | 10.7% | 8.9% | 9.2% |

(1) Without urea, which is no longer present after fermentation.

Formate:

The formate content was measured as described in the MSDA method.

The MSDA is the Manuel Suisse des Denrées Alimentaires [Swiss Manual of Foodstuffs] (Edition 2001, French translation 2002, revision 2004); it is available from the Office Fédéral de la Santé Publique de la Conféderation Suisse (http://www.bag.admin.ch/index.html?lan=en); see more particularly Chapter 61B, "enzymatic assay" in the MSDA, method 3.5 (this chapter is accessible on line at http://www.bag-anw.admin.ch/SLMB_online/PDF/Data%20SLMB_DM contentDA/Version%20F/44_Agents%20conservateurs.pdf).

The following results were obtained:

TABLE 5

| | Reference yogurt | Powder 1 of invention | Powder 2 of invention |
|---|---|---|---|
| Formic acid (mg/100 g) | 56 | 127 | 138 |

TABLE 5-continued

|  | Reference yogurt | Powder 1 of invention | Powder 2 of invention |
|---|---|---|---|
| Constant dry extract | 392 | 127 | 138 |

Folates (Vitamin B9):

The folates content was measured as described in French standard NF EN 14131 (February 2004—classification number V03-137).

NF standards are available from AFNOR (Association Française de Normalisation [French Standards Association]; 11, rue Francis de Pressensé, 93571 La Plaine Saint-Denis Cedex, France).

The following results were obtained:

TABLE 6

|  | Reference yogurt | Powder 1 of invention | Powder 2 of invention |
|---|---|---|---|
| Folates including free folic acid (micrograms/100 g) | 12.95 | 187 | 185 |
| Constant dry extract | 90.65 | 187 | 185 |

Comments:

It can be seen that the powders of the invention have beta-galactosidase activities and nitrogen contents which are entirely comparable with those of the reference yogurt.

The powders of the invention contain formate, which indicates that there has been a genuine exercise of fermentary activity by the inoculated ST and LB of the invention.

In the examples of the powder of the invention presented here, the formate contents are about two times less stronger than those measured in the reference yogurt. The formate is produced by S. thermophilus and is consumed by L. bulgaricus. However, in the powders of the invention, the ST/LB ratio is more favourable to L. bulgaricus than the reference yogurts (about double that of L. bulgaricus). In the powders of the invention, there is thus a higher consumption of formate, which explains the lower level in the yogurt powder. However, the presence of formate indicates a secondary production of this metabolite by S. thermophilus.

Particularly remarkably, the inventors have observed that the powders of the invention have a folates content (vitamin B9) which is substantially higher than that of the reference yogurts, namely a content which is approximately double.

The metabolic characteristics of the powders of the invention are entirely equivalent to those of the reference yogurts.

In can also be seen that for certain secondary metabolites, such as folates (vitamin B9), the characteristics of the powders of the invention are even substantially better than those of the reference yogurts.

Example 11

Comparison with a "False" Yogurt Powder, i.e. a Powder in which the Bacteria are Simply Supplied without Fermentary Activity (Exogenous Supply of Bacteria)

A powder of the invention was produced as described in Example 8 (dairy substrate with a high DM content as described in Example 8; inoculation with frozen concentrates produced as described in Example 2; drying process of Example 9). This powder contained $2.2 \times 10^9$ cfu of ST CNCM I-2130 and LB CNCM I-1519 symbiosis yogurt per gram of powder.

At the same time, a false yogurt powder was produced by simple addition of ST and LB bacteria to a skimmed milk powder, with the bacteria not exerting a fermentary activity (simple exogenous supply of bacteria). This false powder was produced as follows:

addition of concentrated freeze dried Danisco Yo-Mix 495 LYO yogurt ferment to skimmed milk powder so that the final concentration in ST+LB symbiosis was about $2.2 \times 10^9$ cfu/g;

homogenization by agitation.

The following results were obtained:

TABLE 7

|  | Powder of the invention | False powder (exogenous addition of ST and LB) |
|---|---|---|
| Beta-galactosidase activity/g | 48 | 1.8 |

It will be observed that the powder of the invention had a beta-galactosidase activity which was substantially higher than that of the false powder.

Comparable results could be obtained with a powder of the invention produced as described in Example 1, i.e. from a dairy substrate with a conventional DM content.

Example 12

Comparison of Powders of the Invention with Commercial Powders

The storage capacities of the powder of the invention were compared with those of currently commercially available powders.

Three types of powders were compared:

the M/A 5.4 Active powder sold by Dr Otto Süwelack (Joseph-Süwelack Strasse, D-48727 Billerbeck, Germany);

EPI PY48 and EPI 905 powders (EPI, Z I de l'Hermitage; PO Box 108; F-44153 Ancenis Cedex; France);

the powders of the invention, denoted as follows:

Danone 1, Danone 2, Danone 3: powders of the invention produced in accordance with Example 1 by inoculating a dairy substrate with a conventional DM content using frozen concentrates of ST and LB (produced as described in Example 2), the yogurt being dried as described in Example 3, each of the three powders Danone 1, Danone 2, Danone 3 having different concentrations of ST+LB; and by Danone 4: a powder of the invention, produced in accordance with Example 8 by inoculating a dairy substrate with a high DM content using frozen concentrates of ST and LB (produced as described in Example 2), the yogurt being dried as described in Example 9.

In a first series of tests, the survival of the lactic ferments of commercial yogurt powders and the powders of the invention was evaluated under different storage conditions: the powder alone or incorporation into an anhydrous filling, the temperature varying between 5° C. and 35° C. and the time being between 3 days and more than 6 months.

The test food filling was composed of:

TABLE 8

| Ingredient | % used in filling (%, w/w) |
|---|---|
| Vegetable fat (32*hydrogenated copra) | 43.9% |
| Dextrose | 7.2% |
| Icing sugar | 37.2% |
| Mild lactoserum | 1.5% |
| Yogurt powder of the invention | 10.2% |
| Total | 100% |

*Copra hydro 32 = completely hydrogenated copra with a melting point of 32° C.

The % of live or viable LB and/or ST was measured in accordance with the official ROPY method, the method for measuring the ferments in the filling was strictly the same as the powders (5 g was removed in the 2 cases and it was diluted in a medium as described in Example 5 below).

The results are illustrated in Tables 9 and 10 below and in FIGS. 5, 6 and 11.

TABLE 9

|  | Süwelack M/A 5.4 Active powder | EPI PY 48 powder | Powder of invention |
|---|---|---|---|
| Initial population (cfu/g) ± standard deviation | $2.9 \pm 0.7 \times 10^7$ | $1.6 \pm 0.2 \times 10^7$ | Danone 1: $8.7 \pm 4 \times 10^9$<br>Danone 2: $3.7 \pm 1.8 \times 10^9$<br>Danone 3: $5.8 \pm 3.2 \times 10^9$<br>Danone 4: $1.8 \pm 0.3 \times 10^9$ |
| Log (population) | 7.5 | 7.2 | Danone 1: 9.9<br>Danone 2: 9.6<br>Danone 3: 9.8<br>Danone 4: 9.25 |

TABLE 10

|  | Süwelack M/A 5.4 Active powder | EPI PY 48 powder | Powder of invention |
|---|---|---|---|
| Residual population at 4° C. and 1 month | $1.4 \times 10^7$ | $1.2 \times 10^7$ | Danone 1: $8.7 \pm 4 \times 10^9$<br>Danone 2: $3.7 \pm 1.8 \times 10^9$<br>Danone 3: $5.8 \pm 3.2 \times 10^9$<br>Danone 4: $1.6 \pm 0.8 \times 10^9$ |
| % survival at 4° C. and 1 month | $47 \pm 7\%$ | $74 \pm 18\%$ | Danone 1: 100%<br>Danone 2: 100%<br>Danone 3: 100%<br>Danone 4: 90% |
| Residual population at 4° C. and 6 months | $8.7 \times 10^8$ |  | Danone 1: $1.5 \pm 0.1 \times 10^{10}$<br>Danone 2: $6.3 \pm 0.1 \times 10^9$<br>Danone 3: $4.5 \pm 0.7 \times 10^9$ |
| % survival at 4° C. and 6 months | 30% |  | Danone 1: 100%<br>Danone 2: 100%<br>Danone 3: 100% |
| Residual population at 20° C. and 1 month | $8.7 \times 10^6$ |  | Danone 1: $8.7 \pm 4 \times 10^9$<br>Danone 2: $3.7 \pm 1.8 \times 10^9$<br>Danone 3: $5.8 \pm 3.2 \times 10^9$<br>Danone 4: $1.7 \pm 0.5 \times 10^9$ |
| % survival at 20° C. and 1 month | $30 \pm 2\%$ |  | Danone 1: 100%<br>Danone 2: 100%<br>Danone 3: 100%<br>Danone 4: 93% |
| Residual population at 20° C. and 6 months | $2 \times 10^5$ |  | Danone 1: $7 \pm 7 \times 10^9$<br>Danone 2: $3.2 \times 10^9$<br>Danone 3: $3.8 \times 10^9$ |
| % survival at 20° C. and 6 months | 6% |  | Danone 1: 80%<br>Danone 2: 94%<br>Danone 3: 100% |
| Residual population at 35° C. and 2 weeks | $10^3$ | $4.4 \times 10^3$ | Danone 1: $2.5 \times 10^9$<br>Danone 2: $2.1 \times 10^9$<br>Danone 3: $1.4 \times 10^9$<br>Danone 4: $7.1 \times 10^9$ |
| % survival at 35° C. and 2 weeks | 0.004% | 0.4% | Danone 1: $29 \pm 8\%$<br>Danone 2: $58 \pm 4\%$<br>Danone 3: $24 \pm 5\%$<br>Danone 4: 40% |

It will be seen that, in contrast to commercial powders, the stability of the powders of the invention is excellent at ambient temperature (T=20° C., for example).

FIG. 11 clearly illustrates this exceptional stability.

After 4 months storage at a temperature of 20° C., the survival rate of the ST+LB bacteria contained in the powders of the invention has a minimum of 80%, more generally at least 90%. ST bacteria have a particularly high survival rate compared with LB bacteria; the survival rate of ST thus has at least equal and more generally higher than the ST+LB survival rate. In fact, the survival rate of STs after storage for 4 months at a temperature of 20° C. was at least 90%, more generally at least 95%.

After 6 months storage of the powder at a temperature of 20° C., the survival rate of the *S. thermophilus* and *L. bulgaricus* population contained in a powder of the invention was at least 75%, more generally at least 85%. In fact, the survival rate of STs after storage for 6 months at a temperature of 20° C. was at least 85%, more generally at least 90%.

Example 13

Comparison of a Powder of the Invention with Commercial Powders

After the tests described in Example 12, we compared the kinetic changes in the populations of ferments of three types of powder described in Example 12, namely:
the M/A 5.4 Active powder sold by Dr Otto Süwelack (Joseph-Süwelack Strasse, D-48727 Billerbeck, Germany);
EPI PY48 and EPI 905 powders (EPI, Z I de l'Hermitage; PO Box 108; F-44153 Ancenis Cedex; France);
the powders of the invention, denoted as follows: Danone 1, Danone 2, Danone 3 (3 different ST+LB concentrations).

The powders of the invention were produced as described in Example 1 above. The storage capacities of these powders were compared as described in Example 12 above (% survival), either in the form of the "powder alone" or in the form of anhydrous filling.

The fillings had the same composition as those described in Example 12, filling without water.

The "powder alone" and "filling" storage values were recorded, taking into account the dilution carried out in the filling formula.

1. Comparison of Kinetic Evolution of Populations of Ferments:

The populations of *Streptococcus thermophilus* and *Lactobacillus bulgaricus* were measured as a function of time and storage temperature.

The pure yogurt powder or, as appropriate, the anhydrous filling, was analyzed using the official FIL method (see Example 5 below).

The change in the populations was then represented as a function of time, and adjusted (using an Excel® solver) by a kinetic model of $2^{nd}$ order, as described in equation (2):

$$88/18$$

where $C(t)$ is the population of ferments at time t ($g^{-1}$), $C_0$ is the initial population ($g^{-1}$) of ferments, k is the rate constant ($g \cdot day^{-1}$) and t is the time (day).

This adjustment may be carried out both on the total population (ST+LB) or on the corresponding populations. However, since commercial powders have a very low *L. bulgaricus* content, their analysis of the total flora allowed an objective comparison of all of the powders to be made. Table 11 below shows the results obtained.

In this table 11, $<C_0>$ and $<k>$ indicate the mean values of the initial populations and rate constants respectively found by adjusting the various series of data.

In Table 11 below, the notation $<>$ means a mean value of several measurements.

TABLE 11

| Powder | T (° C.) | $<C_0>$ ± standard dev | Log (Co) | $<k>$ ± std dev | Product, k.C0 |
| --- | --- | --- | --- | --- | --- |
| Dr Süw M/A 5.4 | 5 | $2.9 ± 0.7 \times 10^7$ | 7.5 | $2.7 ± 1.5 \times 10^{-10}$ | $9.6 \times 10^{-3}$ |
| Dr Süw M/A 5.4 | 20 | | | $1.4 ± 0.6 \times 10^{-9}$ | $4.9 \times 10^{-2}$ |
| Dr Süw M/A 5.4 | 35 | | | $4.4 ± 4 \times 10^{-6}$ | $1.6 \times 10^{-2}$ |
| EPI PY48 | 5 | $1.6 ± 0.2 \times 10^7$ | 7.2 | $5.7 ± 0.6 \times 10^{-10}$ | $9.0 \times 10^{-3}$ |
| Danone 1 | 5 | $8.7 ± 4 \times 10^9$ | 9.9 | — | |
| Danone 1 | 20 | | | — | |
| Danone 1 | 30 | | | $7.2 \times 10^{-12}$ | $6.2 \times 10^{-2}$ |
| Danone 1 | 35 | | | $1.2 \times 10^{-11}$ | $1.1 \times 10^{-1}$ |
| Danone 1 | 40 | | | $4.0 \times 10^{-11}$ | 0.35 |
| Danone 1 | 45 | | | $7.8 \times 10^{-11}$ | 0.68 |
| Danone 1 | 50 | | | $1.0 \times 10^{-11}$ | 87 |
| Danone 2 | 5 | $3.7 ± 1.9 \times 10^9$ | 9.6 | — | |
| Danone 2 | 20 | | | — | |
| Danone 2 | 30 | | | $1.0 \times 10^{-12}$ | $3.7 \times 10^{-3}$ |
| Danone 2 | 35 | | | $1.1 \times 10^{-11}$ | $4.2 \times 10^{-2}$ |
| Danone 3 | 5 | $5.8 ± 3 \times 10^9$ | 9.9 | — | |
| Danone 3 | 20 | | | — | |
| Danone 3 | 30 | | | $9.5 \times 10^{-12}$ | $5.5 \times 10^{-12}$ |
| Danone 3 | 35 | | | $3.1 \times 10^{-11}$ | $1.8 \times 10^{-1}$ |

The initial populations have already been shown in FIG. 5 and discussed in Example 12. The rate constants reflect the rate of disappearance of the live or viable germs, and thus the mortality kinetics. The factor dictating these kinetics is the product $k \cdot C_0$, which is multiplied by time in equation (2). FIG. 7 shows the evolution of this product as a function of the storage temperature for different commercial products and powders of the invention.

FIG. 7 shows that the stabilities of the powders of the invention are much greater than those of prior art powders. In particular, the stability at 35° C. of the powders of the invention is (almost) comparable with that of prior art powders between 5° C. and 20° C., thus under storage conditions judged to be optimum for the skilled person.

More precisely, the mortality rate increases with temperature in a quasi exponential manner, up to a critical temperature where the mortality increased much more rapidly. With the powders of the invention, this critical temperature is in the range 45° C. to 50° C., and is thus higher than that of commercially available powders, such as those from Dr Süwelack (critical temperature between 30° C. and 35° C.).

The powders of the invention thus exhibit both good stability over time at ambient temperature and also good thermal stability, which renders them suitable for use in foodstuffs under ambient temperature storage conditions or close to ambient temperature.

In fact, the results obtained with single powder are sufficiently comparable with those obtained with this same powder incorporated into the filling; this is why the two types of results, when available, are present in one and the same results group.

These results give rise to two comments:
There is a large difference in the initial populations of the ferments:

The concentrations measured in the commercial powders are at least 100 times lower than those measured in a powder of the invention under the same conditions. FIG. 5 shows the initial population differences in the ferments (in this Figure, Danone 1, Danone 2 and Danone 3 are the powders of the present invention, while "Dr Süwelack" and "EPI PY48" are prior art powders).

The rate constants are also very different:
With the prior art powders, the decrease in the populations of ferments is detectable on a scale of a month for temperatures of 5° C. to 20° C. At 35° C., for MIA 5.4 Active powder from Dr Süwelack powders, an almost complete decrease in ferments was observed in 2 weeks.

FIG. 6 illustrates this point by showing the change in populations at 20° C. in the 3 powders of the invention. The error bars correspond to the uncertainty in the measurement which was 0.3 log units. A similar situation was observable at 5° C.

At 30° C. and 35° C., a slight decrease in the populations contained in the powder of the invention was measurable on a scale of a week. The rate constants nevertheless remain far below those observed for prior art powders, which shows the very much greater stability of the ferments in the powders generated in the invention.

These results are illustrated in FIG. 7. In FIG. 7, Danone 1, Danone 2 and Danone 3 are the powders of the invention, while "Süwelack" and "EPI" are prior art powders.

The difference in the thermal stability of the lactic flora can be quantified by considering the product of the rate constant k and the initial population Co (Table 11): in fact, in the kinetic model, the time is multiplied by the product $k \cdot C_0$, which thus reflects the rate at which the flora die during storage. FIG. 7 shows the change in the product $k \cdot C_0$ as a function of the storage time for different powders: in particular, it will be observed that the mortality rate of the ferments in the Danone powders at 35° C. is almost equivalent to that of commercial powders at 5° C. (considered by the skilled person to be excellent storage conditions).

It will be seen that at an equivalent temperature, the powders of the invention store much better than prior art powders.

FIGS. 8A and 8B show the change in the "normalized" population (i.e. the ratio between the population at a time t over the initial population) of lactic ferments over time for the powders of the invention, and for the powders of the invention. The time scale corresponds to data for prior art Dr Süwelack powders (red squares) as well as the adjustment using the second order model (continuous thick line).

For all of the other series of points, the data were translated into the time scale for the prior art data using a multiplicative factor: as an example, when the temperature increases, the lactic flora decrease more rapidly, which may be compensated for graphically by using a multiplication factor of more than 1 (for example, if the population decreases twice as fast, the factor "2" is 2). This multiplicative factor is correlated with the product $k \cdot C_0$ shown in FIG. 7. The superimposed data form "master curves". It will thus be seen that, regardless of the rate of population decrease, all of the data series follow the same second order kinetics.

The invention claimed is:

1. A powder of a food composition, wherein said food composition is yogurt or fermented milk for human consumption, wherein at least one strain of *S. thermophilus* is contained in said powder in a live or viable form at a concentration of at least $1 \times 10^9$ cfu/g, wherein at least one strain of *L. bulgaricus* is contained in said powder in a live or viable form at a concentration of at least $1 \times 10^4$ cfu/g, wherein said powder has an Aw (water activity) of 0.25 or less, and wherein said at least one strain of *S. thermophilus* is a strain of *S. thermophilus*, which does not produce exopolysaccharides (EPS), or which produces EPS in such a small amount that a standard medium for milk fermentation composed of 120 grams of skimmed milk powder, 1 gram of N3 peptide, and permutated water up to a QS of 1 L, after culture of said strain at a temperature of 40° C. to a pH of 4.7, has a Casson viscosity at 4° C. of 500 mPa·s or less.

2. The powder of claim 1, wherein after storing the powder for four months at 20° C., the total population of said at least one strain of *S. thermophilus* and said at least one strain of *L. bulgaricus*, which is contained in said powder in a live or viable form, is at least $2 \times 10^8$ cfu/g.

3. A powder of a food composition, wherein said food composition is yogurt or fermented milk for human consumption, wherein at least one strain of *S. thermophilus* is contained in said powder in a live or viable form at a concentration of at least $5 \times 10^8$ cfu/g, wherein at least one strain of *L. bulgaricus* is contained in said powder in a live or viable form at a concentration of at least $1 \times 10^4$ cfu/g, wherein said powder has an Aw (water activity) of 0.25 or less, and wherein said at least one strain of *S. thermophilus* is a strain of *S. thermophilus*, which does not produce exopolysaccharides (EPS), or which produces EPS in such a small amount that a standard medium for milk fermentation composed of 120 grams of skimmed milk powder, 1 gram of N3 peptide, and permutated water up to a QS of 1 L, after culture of said strain at a temperature of 40° C. to a pH of 4.7, has a Casson viscosity at 4° C. of 500 mPa·s or less.

4. The powder of claim 3, wherein said at least one strain of *S. thermophilus* is the strain of *S. thermophilus* deposited with the CNCM with accession number I-2130.

5. The powder of claim 3, wherein said at least one strain of *L. bulgaricus* is contained in said powder in a live or viable form at a concentration of at least $2 \times 10^4$ cfu/g.

6. The powder of claim 3, wherein after storing the powder for four months at 20° C., the total population of said at least one strain of *S. thermophilus* and said at least one strain of *L. bulgaricus*, which is contained in said powder in a live or viable form, after said four months, is at least $2 \times 10^8$ cfu/g.

7. The powder of claim 3, wherein said powder of fermented milk or yogurt has an Aw (water activity) of 0.2 or less.

8. The powder of claim 3, wherein said powder of fermented milk or of yogurt has an Aw (water activity) of 0.09 to 0.19.

9. A food product, comprising at least one powder of claim 3.

10. The food product of claim 9, which is a food filling.

11. The food product of claim 10, wherein said food filling is an anhydrous filling.

12. The food product of claim 9, which is a biscuit, which comprises said powder in an anhydrous filling.

13. The powder of claim 3, wherein said at least one strain of S. thermophilus is contained in said powder in a live or viable form at a concentration of at least $2 \times 10^9$ cfu/g.

14. The powder of claim 3, wherein said at least one strain of S. thermophilus, after culture of said strain at a temperature of 40° C. to a pH of 4.7, has a Casson viscosity at 4° C. of 400 mPa·s or less.

15. The powder of claim 3, wherein said at least one-strain of L. bulgaricus is contained in said powder in a live or viable form at a concentration of at least $3 \times 10^4$ cfu/g.

16. The powder of claim 3, wherein, after storing the powder for four months at 20° C., the total population of said at least one strain of S. thermophilus and said at least one strain of L. bulgaricus, which is contained in said powder in a live or viable form is at least $3.5 \times 10^8$ cfu/g.

17. The powder of claim 3, wherein, after storing the powder for four months at 20° C., the total population of said at least one strain of S. thermophilus and said at least one strain of L. bulgaricus, which is contained in said powder in a live or viable form is at least $4 \times 10^8$ cfu/g.

18. The powder of claim 3, which does not comprise a powder of L. bulgaricus culture medium.

19. The powder of claim 3, the composition of which qualifies as a yogurt.

20. A powder of a food composition, wherein said food composition is yogurt or fermented milk for human consumption, wherein at least one strain of S. thermophilus is contained in said powder in a live or viable form at a concentration of at least $5 \times 10^8$ cfu/g, wherein at least one strain of L. bulgaricus is contained in said powder in a live or viable form at a concentration of at least $1 \times 10^4$ cfu/g, wherein said powder has an Aw (water activity) of 0.25 or less, wherein said powder is not the mixture of a powder of yogurt or fermented milk with a powder of L. bulgaricus culture medium, and wherein said at least one strain of S. thermophilus is a strain of S. thermophilus, which does not produce exopolysaccharides (EPS), or which produces EPS in such a small amount that a standard medium for milk fermentation composed of 120 grams of skimmed milk powder, 1 gram of N3 peptide, and permutated water up to a QS of 1 L, after culture of said strain at a temperature of 40° C. to a pH of 4.7, has a Casson viscosity at 4° C. of 500 mPa·s or less.

21. A powder of a food composition, wherein said food composition is yogurt or fermented milk for human consumption, wherein at least one strain of S. thermophilus is contained in said powder in a live or viable form at a concentration of at least $5 \times 10^8$ cfu/g, wherein at least one strain of L. bulgaricus is contained in said powder in a live or viable form at a concentration of at least $1 \times 10^4$ cfu/g, wherein said powder has an Aw (water activity) of 0.25 or less, and wherein said powder does not comprise any thickening agent, and wherein said at least one strain of S. thermophilus is a strain of S. thermophilus, which does not produce exopolysaccharides (EPS), or which produces EPS in such a small amount that a standard medium for milk fermentation composed of 120 grams of skimmed milk powder, 1 gram of N3 peptide, and permutated water up to a QS of 1 L, after culture of said strain at a temperature of 40° C. to a pH of 4.7 has a Casson viscosity at 4° C. of 500 mPa·s or less.

22. The powder of claim 21, which does not comprise any ingredient other than those produced by lactic fermentation.

23. A powder of a food composition, wherein said food composition is yogurt or fermented milk for human consumption, wherein at least one strain of S. thermophilus is contained in said powder in a live or viable form at a concentration of at least $5 \times 10^8$ cfu/g, wherein at least one strain of L. bulgaricus is contained in said powder in a live or viable form at a concentration of at least $1 \times 10^4$ cfu/g, wherein said powder has an Aw (water activity) of 0.25 or less, wherein the folate content of said powder is higher than the folate content at constant dry extract of a yogurt or fermented milk, which contains said at least one S. thermophilus strain in a live or viable form at $5 \times 10^8$ cfu/g and said at least one L. bulgaricus strain in a live or viable form at $5 \times 10^6$ cfu/g, and wherein said at least one strain of S. thermophilus is a strain of S. thermophilus, which does not produce exopolysaccharides (EPS), or which produces EPS in such a small amount that a standard medium for milk fermentation composed of 120 grams of skimmed milk powder, 1 gram of N3 peptide, and permutated water up to a QS of 1 L, after culture of said strain at a temperature of 40° C. to a pH of 4.7, has a Casson viscosity at 4° C. of 500 mPa·s or less.

\* \* \* \* \*